(12) United States Patent
Tamada

(10) Patent No.: US 8,031,351 B2
(45) Date of Patent: Oct. 4, 2011

(54) IMAGE FORMATION APPARATUS CONNECTED TO POWER SUPPLYING DEVICE CAPABLE OF SUPPLYING POWER VIA DATA COMMUNICATION LINE, CONTROL METHOD PERFORMED BY SAME IMAGE FORMATION APPARATUS AND STORAGE MEDIUM STORING PROGRAM EXECUTED BY SAME IMAGE FORMATION APPARATUS

(75) Inventor: Takeshi Tamada, Toyohashi (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 225 days.

(21) Appl. No.: 12/562,465

(22) Filed: Sep. 18, 2009

(65) Prior Publication Data

US 2010/0073703 A1    Mar. 25, 2010

(30) Foreign Application Priority Data

Sep. 19, 2008   (JP) ................................. 2008-240227

(51) Int. Cl.
*G06K 15/00* (2006.01)
*G06F 3/12* (2006.01)
(52) U.S. Cl. ....................... 358/1.14; 358/1.15; 358/1.13
(58) Field of Classification Search ................. 358/1.14, 358/1.1, 1.15, 1.13, 1.6, 1.9, 1.16, 1.17, 1.18, 358/400, 401, 402, 403, 404, 405, 407, 434, 358/435, 436, 437, 438, 439, 444, 468, 500, 358/501, 540; 713/310, 300, 320, 321, 322, 713/323, 324, 330, 340, 160, 170, 169, 155, 713/164, 176, 153, 168, 182, 1, 183, 184, 713/100, 185, 186, 150, 151, 152, 161, 187; 347/1, 2, 3, 5, 14, 23, 111, 171, 224; 399/1, 8, 9, 38, 130; 380/243, 55, 51; 710/260, 72, 64, 62, 15, 8; 382/115, 116, 117, 118, 119, 124, 100

See application file for complete search history.

(56) References Cited

U.S. PATENT DOCUMENTS 6,995,877 B2    2/2006  Suzuki
2006/0200704 A1 9/2006  Takahashi et al.
(Continued)

FOREIGN PATENT DOCUMENTS

JP         8-307562        11/1996
(Continued)

OTHER PUBLICATIONS

Japanese Office Action mailed Sep. 29, 2009, directed to related Japanese Application No. 2007-260967; 4 pages.

(Continued)

*Primary Examiner* — Dov Popovici
(74) *Attorney, Agent, or Firm* — Morrison & Foerster LLP

(57) ABSTRACT

A message displaying area displays a message "DATA HAS BEEN RECEIVED", which indicates that a print instruction has been received, as well as a message "CONDUCT AUTHENTICATION", which urges a user to enter identification information. On the other hand, an input area displays a form in which a "username" and a corresponding "password" are to be entered. Specifically, a display presents an entry screen for identification information, including messages indicating that a print instruction has been received and authentication is required.

21 Claims, 13 Drawing Sheets

U.S. PATENT DOCUMENTS

| | | |
|---|---|---|
| 2008/0198402 A1 * | 8/2008 | Azuma et al. .......... 358/1.15 |
| 2009/0091182 A1 | 4/2009 | Tamada et al. |
| 2009/0262389 A1 | 10/2009 | Tamada |

FOREIGN PATENT DOCUMENTS

| | | |
|---|---|---|
| JP | 10-268960 | 10/1998 |
| JP | 11-31030 | 2/1999 |
| JP | 11-301078 | 11/1999 |
| JP | 2001-358908 | 12/2001 |
| JP | 2002-287658 | 10/2002 |
| JP | 2002-320177 | 10/2002 |
| JP | 2002-361979 | 12/2002 |
| JP | 2003-158529 | 5/2003 |
| JP | 2004-70849 | 3/2004 |
| JP | 2004-185194 | 7/2004 |
| JP | 2004-193807 | 7/2004 |
| JP | 2004-348615 | 12/2004 |
| JP | 2005-250739 | 9/2005 |
| JP | 2006-19788 | 1/2006 |
| JP | 2006-260108 | 9/2006 |
| JP | 2006-293212 | 10/2006 |
| JP | 2007-26083 | 2/2007 |
| JP | 2007-116457 | 5/2007 |
| JP | 2007-149106 | 6/2007 |
| JP | 2007-241615 | 9/2007 |
| JP | 2007-318305 | 12/2007 |
| JP | 2008-118322 | 5/2008 |
| JP | 2009-260629 | 11/2009 |

OTHER PUBLICATIONS

Japanese Office Action mailed on Sep. 28, 2010 directed to Japanese Application No. 240227/2008; (5 pages).

Japanese Decision to Grant Patent, mailed Mar. 15, 2011, directed to Japanese Patent Application No. 2008/240227; 6 pages.

Japanese Office Action mailed Jan. 26, 2010, directed to related Japanese Application No. 2008-106938; 6 pages.

* cited by examiner

FIG.5

| STATUS | POWER STATE | OPERATION SWITCH | AUTHENTICATION PROCESS | PRINT INSTRUCTION | POWER SUPPLY SWITCH OPERATION | DISPLAYED CONTENT |
|---|---|---|---|---|---|---|
| 1 | ON | ON OPERATION | — | — | MAINTAINED | NONE |
| 2 | ON | OFF OPERATION | — | — | POWER ON → OFF SWITCHING | NONE |
| 3 | OFF | ON OPERATION | SUCCEEDED | — | POWER OFF → ON SWITCHING | NONE |
| 4 | OFF | ON OPERATION | FAILED/NO INPUT | NOT RECEIVED | MAINTAINED | FIRST MESSAGE |
| 5 | OFF | ON OPERATION | FAILED/NO INPUT | RECEIVED | MAINTAINED | SECOND MESSAGE |
| 6 | OFF | NOT OPERATED | — | NOT RECEIVED | MAINTAINED | NONE |
| 7 | OFF | NOT OPERATED | — | RECEIVED | MAINTAINED | THIRD MESSAGE |
| 8 | OFF | OFF OPERATION | — | — | MAINTAINED | NONE |

IMAGE FORMATION APPARATUS CONNECTED TO POWER SUPPLYING DEVICE CAPABLE OF SUPPLYING POWER VIA DATA COMMUNICATION LINE, CONTROL METHOD PERFORMED BY SAME IMAGE FORMATION APPARATUS AND STORAGE MEDIUM STORING PROGRAM EXECUTED BY SAME IMAGE FORMATION APPARATUS

This application is based on Japanese Patent Application No. 2008-240227 filed with the Japan Patent Office on Sep. 19, 2008, the entire content of which is hereby incorporated by reference.

BACKGROUND OF THE INVENTION

1. Field of the Invention

The present invention relates to an image formation apparatus connected to a power supplying device capable of supplying power via a data communication line, a control method performed by the image formation apparatus, and a storage medium storing a program used by the image formation apparatus.

2. Description of the Related Art

In recent years, there has been proposed a configuration supplying a networked device with power through a communication line propagating a communication signal (or a data signal). Such a configuration is noted as a method of supplying power for driving Internet Protocol (IP) telephones, wireless access points, network cameras, and the like in particular. As a representative example of a network configuration equipped with a power supplying function as described above is established Institute of Electrical and Electronic Engineers (IEEE) 802.3af. IEEE 802.3af is a standard for supplying predetermined direct-current (DC) power via a communication line used for Ethernet. It is also referred to as Power over Ethernet (PoE). Furthermore, there also exists a power supply system referred to as a universal serial bus (USB) bus power system for a USB standard mainly for connecting a body of a computer and peripheral equipment.

In recent years, in response to increasing concerns about environmental issues, it has been proposed to apply such a configuration, which receives power via a communication line, to an image formation apparatus such as a printer so as to reduce power consumption. Further, a configuration has been proposed which is provided with an authentication function to achieve improved security performance in addition to reduced power consumption.

For example, Japanese Laid-Open Patent Publication No. 2007-241615 discloses an image formation apparatus employing a configuration that allows a power source for a printer board to become on only when authentication is done successfully and utilization of the printer board is permitted accordingly, so as to eliminate wasteful power consumption. Japanese Laid-Open Patent Publication No. 2004-348615 discloses an information processing apparatus allowing for power saving of a printer used for educational e-learning while preventing wrongdoings in the e-learning.

In addition, each of Japanese Laid-Open Patent Publication No. 2006-019788 and Japanese Laid-Open Patent Publication No. 2004-070849 discloses a configuration for controlling powering on and off in accordance with a result of authentication.

An image formation apparatus capable of receiving power via a communication line as described above can receive data even if main power supply (for example, commercial power supply) is interrupted. However, the related arts described above mainly assume configurations that wait for reception of transmitted data after authentication is done successfully, the main power source is then turned on, and power starts to be supplied therefrom. Hence, none of the above-described related arts discloses or suggests a configuration capable of receiving data while supply from the main power source is interrupted.

SUMMARY OF THE INVENTION

The present invention is made to solve such a problem and its object is to provide an image formation apparatus, which is configured to be capable of receiving power via a communication line and is capable of managing power supply efficiently using an authentication function; a control method performed by the image formation apparatus; and a storage medium storing a program used by the image formation apparatus.

According to one aspect of the present invention, an image formation apparatus connected to a power supplying device capable of supplying power via a data communication line is provided. The image formation apparatus includes a control unit, a power conversion unit, a separation unit, a communication unit, a power supply unit, a switch, a manipulation unit, and an authentication unit. The power conversion unit converts external power received from an external power source into first drive power and outputs the first drive power. The separation unit separates a communication signal and power flowing in the data communication line and outputs as second drive power the power thus separated. The communication unit communicates data with an external device. The power supply unit supplies at least one of the first drive power and the second drive power to the control unit and the communication unit. The switch, which is provided between the external power source and the power conversion unit, opens/closes a power path in response to an instruction from the control unit. The manipulation unit receives an instruction input by a user to open/close the switch. The authentication unit performs an authentication process based on identification information input by the user. The control unit is operative to drive the switch into a closed position, if an instruction for closing the switch is received from the manipulation unit while the switch is in an open position and if the authentication process by the authentication unit is done successfully. The control unit is operative to urge the user to input the identification information to close the switch, if the communication unit receives a print instruction while the switch is in the open position.

Preferably, the image formation apparatus further includes a power load unit, operable by receiving the first drive power, for performing an image formation process. The power load unit is configured to perform an image formation process for the print instruction using the first drive power supplied after the switch is switched from the open position to the closed position.

Preferably, the image formation apparatus further includes a display unit for displaying information. The control unit is operative to cause the display unit to display thereon an entry screen for the identification information, including a message indicating that the print instruction has been received.

Preferably, the image formation apparatus is capable of communicating with an information processing apparatus including a display unit. The control unit is operative to cause the display unit of the information processing apparatus to display thereon an entry screen for the identification information, including a message indicating that the print instruction has been received.

Preferably, the control unit is operative to determine whether or not the communication unit has received the print instruction, if the instruction for closing the switch is received from the manipulation unit while the switch is in the open position. The control unit is operative to, if the communication unit has received the print instruction, cause a display unit to display thereon an entry screen for the identification information, including a message indicating that the print instruction has been received.

Preferably, the image formation apparatus further includes a collection unit for collecting history information regarding opening and closing of the switch.

Preferably, the communication unit includes at least one of a first communication unit capable of communicating data with the external device using the communication signal separated by the separation unit, and a second communication unit capable of communicating data with the external device through a telephone line.

According to another aspect of the present invention, a control method performed by an image formation apparatus connected to a power supplying device capable of supplying power via a data communication line is provided. The control method includes the steps of: converting external power received from an external power source into first drive power and outputting the first drive power; separating a communication signal and power flowing in the data communication line; outputting as second drive power the power thus separated; receiving at least one of the first drive power and the second drive power to communicate data with an external device; receiving an instruction input by a user to open/close a switch provided between the external power source and a power conversion unit; performing an authentication process based on identification information input by the user; driving the switch into a closed position, if an instruction for closing the switch is received while the switch is in an open position and if the authentication process is done successfully; and urging the user to input the identification information to close the switch, if a print instruction is received while the switch is in the open position.

Preferably, the control method further includes the step of performing an image formation process for the print instruction using the first drive power supplied after the switch is switched from the open position to the closed position.

Preferably, the control method further includes the step of displaying an entry screen for the identification information, including a message indicating that the print instruction has been received.

Preferably, the control method further includes the step of causing a display unit of an information processing apparatus capable of communicating with the image formation apparatus to display thereon an entry screen for the identification information, including a message indicating that the print instruction has been received.

Preferably, the control method further includes the steps of: determining whether or not the print instruction has been received, when the instruction for closing the switch is received while the switch is in the open position; and if the print instruction has been received, displaying an entry screen for the identification information, including a message indicating that the print instruction has been received.

Preferably, the control method further includes the step of collecting history information regarding opening and closing of the switch.

According to still another aspect of the present invention, a storage medium storing a program used in an image formation apparatus connected to a power supplying device capable of supplying power via a data communication line is provided. The image formation apparatus includes a processor, a power conversion unit, a separation unit, a communication unit, a power supply unit, a switch, a manipulation unit, and an authentication unit. The power conversion unit converts external power received from an external power source into first drive power and outputs the first drive power. The separation unit separates a communication signal and power flowing in the data communication line and outputs as second drive power the power thus separated. The communication unit communicates data with an external device. The power supply unit supplies at least one of the first drive power and the second drive power to the processor and the communication unit. The switch, which is provided between the external power source and the power conversion unit, opens/closes a power path in response to an instruction from the processor. The manipulation unit receives an instruction input by a user to open/close the switch. The authentication unit performs an authentication process based on identification information input by the user. When the program is executed by the processor, the program causes the processor to be operative to: drive the switch into a closed position, if an instruction for closing the switch is received from the manipulation unit while the switch is in an open position and if the authentication process by the authentication unit is done successfully; and urge the user to input the identification information to close the switch, if the communication unit receives a print instruction while the switch is in the open position.

Preferably, the image formation apparatus further includes a power load unit, operable by receiving the first drive power, for performing an image formation process. The processor is operative to cause the power load unit to perform an image formation process for the print instruction using the first drive power supplied after the switch is switched from the open position to the closed position.

Preferably, the image formation apparatus further includes a display unit for displaying information. The processor is operative to cause the display unit to display thereon an entry screen for the identification information, including a message indicating that the print instruction has been received.

Preferably, the image formation apparatus is configured to be capable of communicating data with an information processing apparatus including a display unit. The processor is operative to cause the display unit of the information processing apparatus to display thereon an entry screen for the identification information, including a message indicating that the print instruction has been received.

Preferably, the processor is operative to determine whether or not the communication unit has received the print instruction, if the instruction for closing the switch is received from the manipulation unit while the switch is in the open position. The processor is operative to, if the communication unit has received the print instruction, cause a display unit to display thereon an entry screen for the identification information, including a message indicating that the print instruction has been received.

Preferably, the processor is operative to collect history information regarding opening and closing of the switch.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 shows a table of power on/off processes in the image formation apparatus according to the first embodiment.

DESCRIPTION OF THE PREFERRED EMBODIMENTS

The present invention in embodiments will now be described with reference to the drawings. In the figures, identical or like components are identically denoted and will not be described repeatedly.

First Embodiment

Configuration of Apparatus

The present invention is directed to an image formation apparatus connected to a network capable of communicating data and supplying power via a communication line. In the present embodiment a multi function peripheral (MFP) equipped with a plurality of functions such as a copy function, a print function, a facsimile function and a scanner function will be described as a representative example of the present image formation apparatus. Furthermore a configuration adopting the PoE system established as IEEE 802.3af will be described as a representative example of the network capable of communicating data and supplying power via a communication line.

Figure 1:
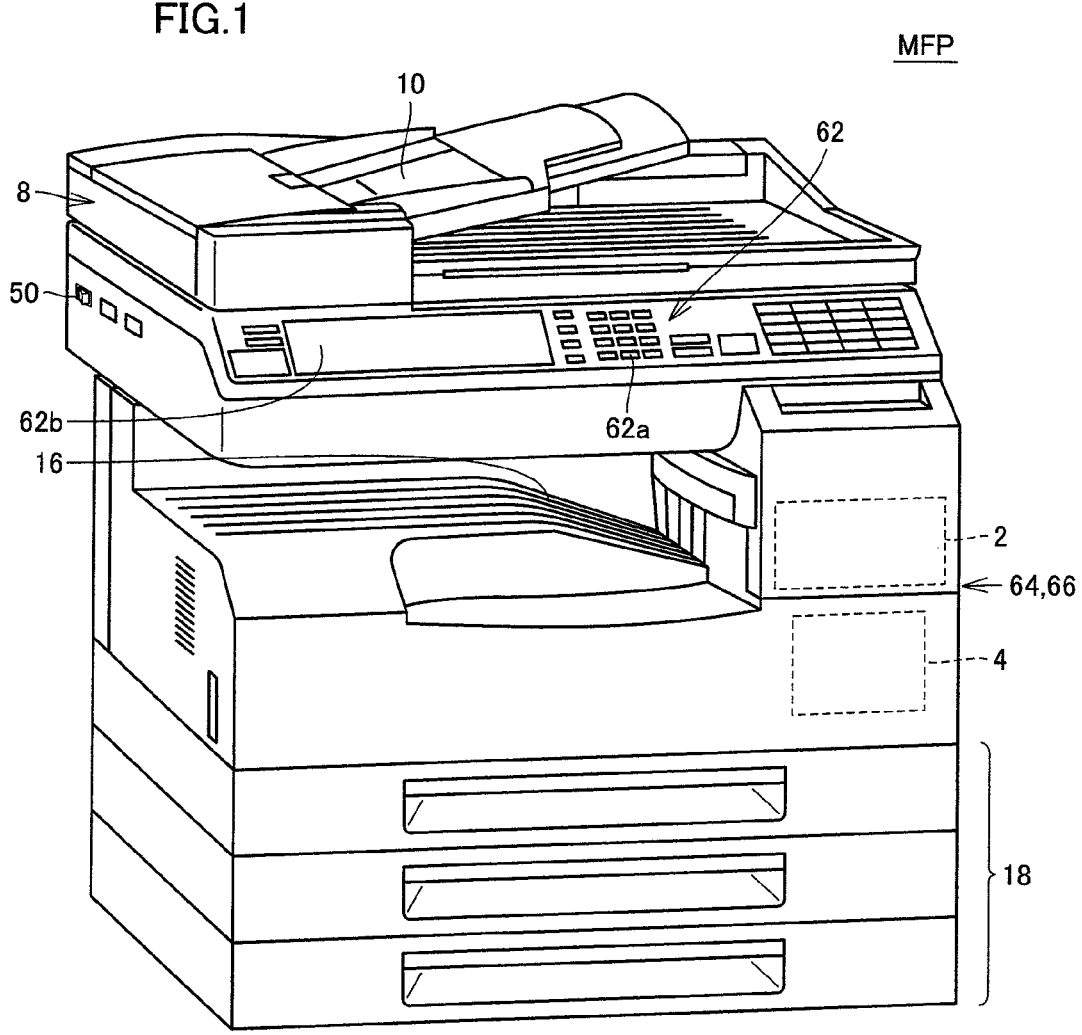
FIG. 1 shows an appearance of an image formation apparatus according to a first embodiment.

With reference to FIG. 1, an image formation apparatus MFP according to a first embodiment includes a control unit 2, a power conditioning unit 4, an image scan unit 8, an automatic document feeding unit 10, a sheet feeding unit 18, a panel unit 62, a sensor unit 64, and a drive unit 66. Note that sensor unit 64 and drive unit 66 configure a print engine load unit 6 constituting a part of a print engine (not shown) for performing a process involved in forming an image (hereinafter, this process will also generally be referred to as "print process"). Print engine load unit 6 corresponds to a power load unit.

Automatic document feeding unit 10 allows for successive scanning of original documents and includes a document feeding tray, a feeding roller, a registration roller, a transport drum, a document receiving tray (all not shown) and the like. When a user manipulates panel unit 62 to enter a start instruction, automatic document feeding unit 10 feeds documents placed on the document feeding tray to be read, one by one as the feeding roller operates.

Image scan unit 8 emits light from a source of light toward a passing document to expose it to light and receives a reflection of the light from the document by a pickup device or the like to scan image information of the document. Note that image scan unit 8 can also scan image information from a document placed on a platen glass. The image information scanned by image scan unit 8 is transmitted to an image processing unit to undergo a predetermined image process and is thus converted to image data and thereafter transmitted to the print engine.

The print engine forms an image from the image data on a sheet. More specifically, the print engine includes a photoreceptor drum, a charger, an image writing unit (or an exposure unit), a development unit, a transcription unit, a discharger, a fuser and fixer device, a cleaning unit and the like (all not shown). These mechanisms operate in a series to implement the print process. Furthermore sensor unit 64 includes a plurality of sensors for detecting a status of each mechanism in panel unit 62, a sensor for detecting how a sheet is transported, a sensor for detecting the temperature of a surface of a heating roller in the fuser and fixer device, and the like. Drive unit 66 includes a motor for rotating the photoreceptor drum and a variety of types of rollers and the like, a laser drive unit driving the exposure unit, and the like.

Sheet feeding unit 18 includes at least one sheet feeding cassette. It is synchronized with the print process in the print engine to feed by a roller or the like a sheet set in a predetermined sheet feeding cassette.

Control unit 2 operates in response to a variety of instructions received via an input key 62a in panel unit 62 to control the print engine and causes a display 62b or the like to display a variety of information. Note that input key 62a includes a start button pressed to indicate that the print process should start and numeral keys used to enter characters, numbers and the like. Display 62b is representatively configured for example of a liquid crystal display (LCD).

Figure 2:
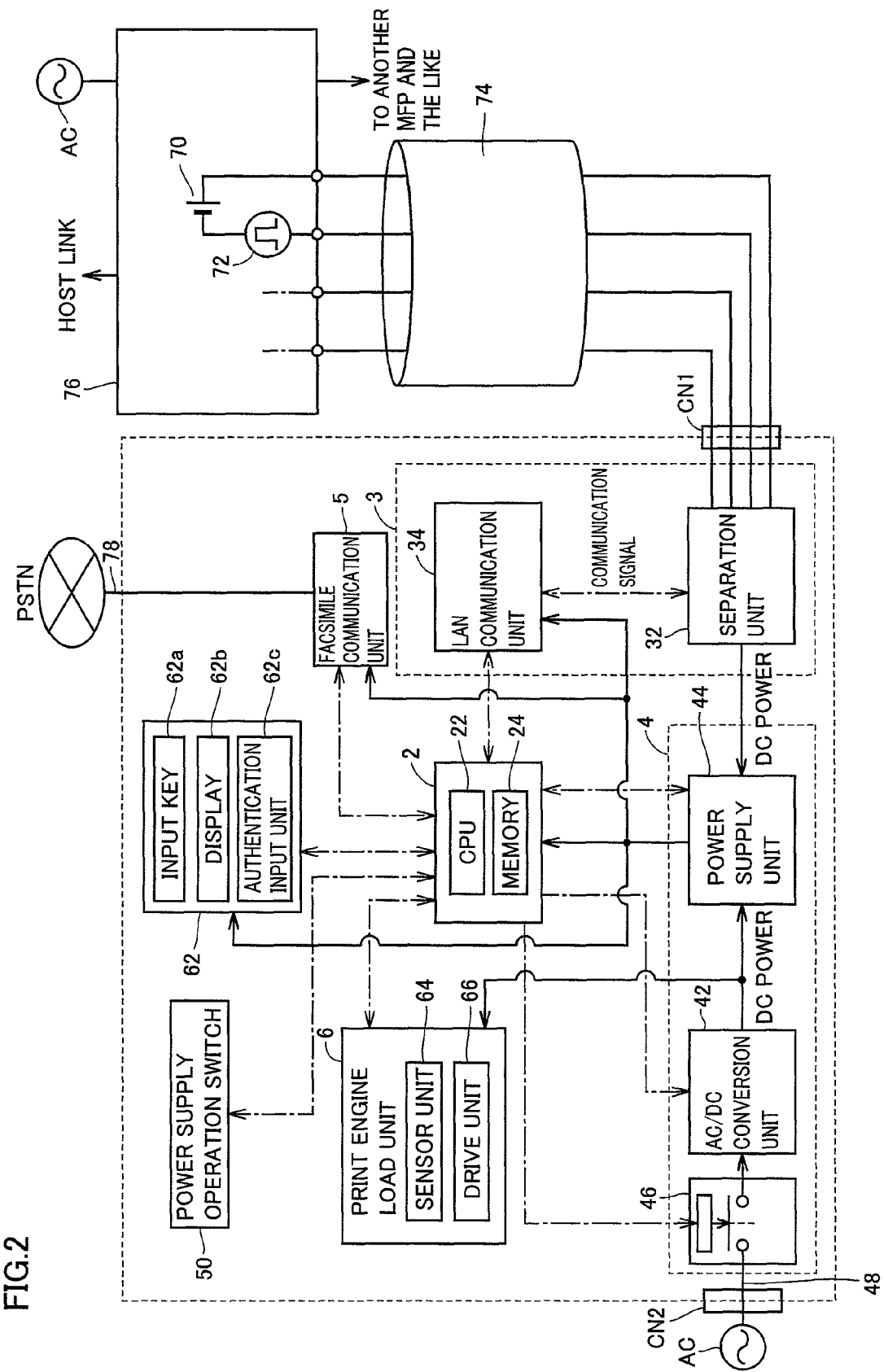
FIG. 2 is a block diagram showing a functional configuration of the image formation apparatus according to the first embodiment.

Panel unit 62 further includes an authentication input unit 62c (FIG. 2). When an operation switch 50 positioned at a side surface of image formation apparatus MFP is switched on, control unit 2 causes display 62b to display thereon a message urging a user to enter identification information, and performs an authentication process based on the identification information input to authentication input unit 62c. In accordance with a result of the authentication process, control unit 2 provides an instruction to power conditioning unit 4. In addition, control unit 2 causes display 62b to display necessary information thereon, depending on whether or not data to be printed (print instruction) has been received.

Authentication input unit 62c is configured to receive a username and/or a password both input by manipulating input key 62a. Alternatively, as authentication input unit 62c, there may be used a reading device for reading identification information from an IC card or an magnetic card, or a reading device handling biometrics information such as fingerprint authentication.

Power conditioning unit 4 intermediates supply of power to control unit 2, print engine load unit 6 and the like. Image formation apparatus MFP according to the present embodiment is configured to receive power supplied from a plurality of external power sources and thus operates thereon, and hereinafter a configuration receiving both alternate-current (AC) power from a power supply system or a like external power source and DC power supplied via a communication line will be illustrated. The former power and the latter power will hereinafter also be referred to as "commercial power" and "network power", respectively. Note that the image formation apparatus may be adapted to receive power from more types of external power sources other than the two types of power exemplified in the present embodiment. Power conditioning unit 4 supplies one of the commercial power and the network power to control unit 2, a LAN communication unit 34 (FIG. 2), facsimile communication unit 5 (FIG. 2), and panel unit 62.

With reference to FIG. 2, in the first embodiment, image formation apparatus MFP is connected via a connector CN1 to a communication line 74. Via communication line 74, image formation apparatus MFP is also connected to a hub device 76 equipped with a power supplying function, which is a representative example of the power supplying device. Another image formation apparatus MFP, a personal computer and the like are also connected to hub device 76, and image formation apparatus MFP can communicate data with hub device 76, another image formation apparatus MFP, the personal computer and the like.

As has been described previously, hub device 76 is equipped with a power supplying function in accordance with the PoE system. As one example, hub device 76 includes a DC voltage supply 70 and an oscillator 72 connected in series to a pair of communication lines 74. DC voltage supply 70 is a power source for supplying power and applies a predetermined voltage to the pair of communication lines 74. Note that according to IEEE 802.3af, it supplies DC power having a voltage value of 48 V. Oscillator 72 superposes on the pair of communication lines 74 a pulsing communication signal (or a data signal) used in communicating data. By such a configuration, communication line 74 will include DC network power and a pulsing (or AC) communication signal.

To accommodate this, image formation apparatus MFP in the present embodiment further includes an interface unit 3 connected to communication line 74. More specifically, interface unit 3 includes a separation unit 32 and LAN communication unit 34.

Image formation apparatus MFP includes a facsimile communication unit 5 connected to a telephone line 78. Facsimile communication unit 5 is capable of receiving facsimile data transmitted from a transmitting end via telephone line 78, public switched telephone networks (PSTN), and the like. In addition, facsimile communication unit 5 is capable of transmitting image data, scanned from a document by automatic document feeding unit 10 (FIG. 1) or the like, to a designated destination as facsimile data.

Furthermore, image formation apparatus MFP receives commercial power from power system AC via a connector CN2. The received commercial power is provided to power conditioning unit 4. Power conditioning unit 4 includes a power supply switch 46, an AC/DC conversion unit 42 and a power supply unit 44. Power supply switch 46 is inserted on a power path extending between power system AC and AC/DC conversion unit 42, and switches to an open position (off) or a closed position (on) between them in response to an instruction from control unit 2. AC/DC conversion unit 42 is for converting AC commercial power received from power system AC into DC power, and representatively includes a power transistor or a similar switching element. AC/DC conversion unit 42 outputs the generated DC power to power supply unit 44 as first drive power.

Separation unit 32 separates the communication signal and the network power flowing on communication line 74 from each other. Separation unit 32 includes a frequency filer representatively, and outputs a DC component of an electrical signal that propagates through communication line 74 as the network power, and an AC component of the electrical signal as the communication signal. The network power separated by separation unit 32 is output as second drive power to power conditioning unit 4 and received by power supply unit 44. Furthermore, LAN communication unit 34 transmits the communication signal and receives the communication signal separated by separation unit 32. More specifically, LAN communication unit 34 generates a communication signal in accordance with data transmitted from control unit 2 and also decodes a communication signal that is received from separation unit 32 into received data and outputs the data to control unit 2. Note that through a pair of communication lines 74 a bidirectional communication signal may be propagated or a monodirectional communication signal may be propagated. If the monodirectional communication signal is propagated, LAN communication unit 34 will have a transmission function and a reception function independently.

Power supply unit 44 selects one of the first drive power and the second drive power received from AC/DC conversion unit 42 and separation unit 32, respectively, and outputs the selected drive power to control unit 2, LAN communication unit 34, facsimile communication unit 5 and panel unit 62. More specifically, as long as power supply unit 44 receives drive power from at least one of AC/DC conversion unit 42 and separation unit 32, power supply unit 44 can maintain control unit 2, LAN communication unit 34, facsimile communication unit 5 and panel unit 62 operatively. Representatively, power supply unit 44 selectively outputs one of the first drive power and the second drive power received from AC/DC conversion unit 42 and separation unit 32, respectively, that has a higher value in voltage.

Figure 3:
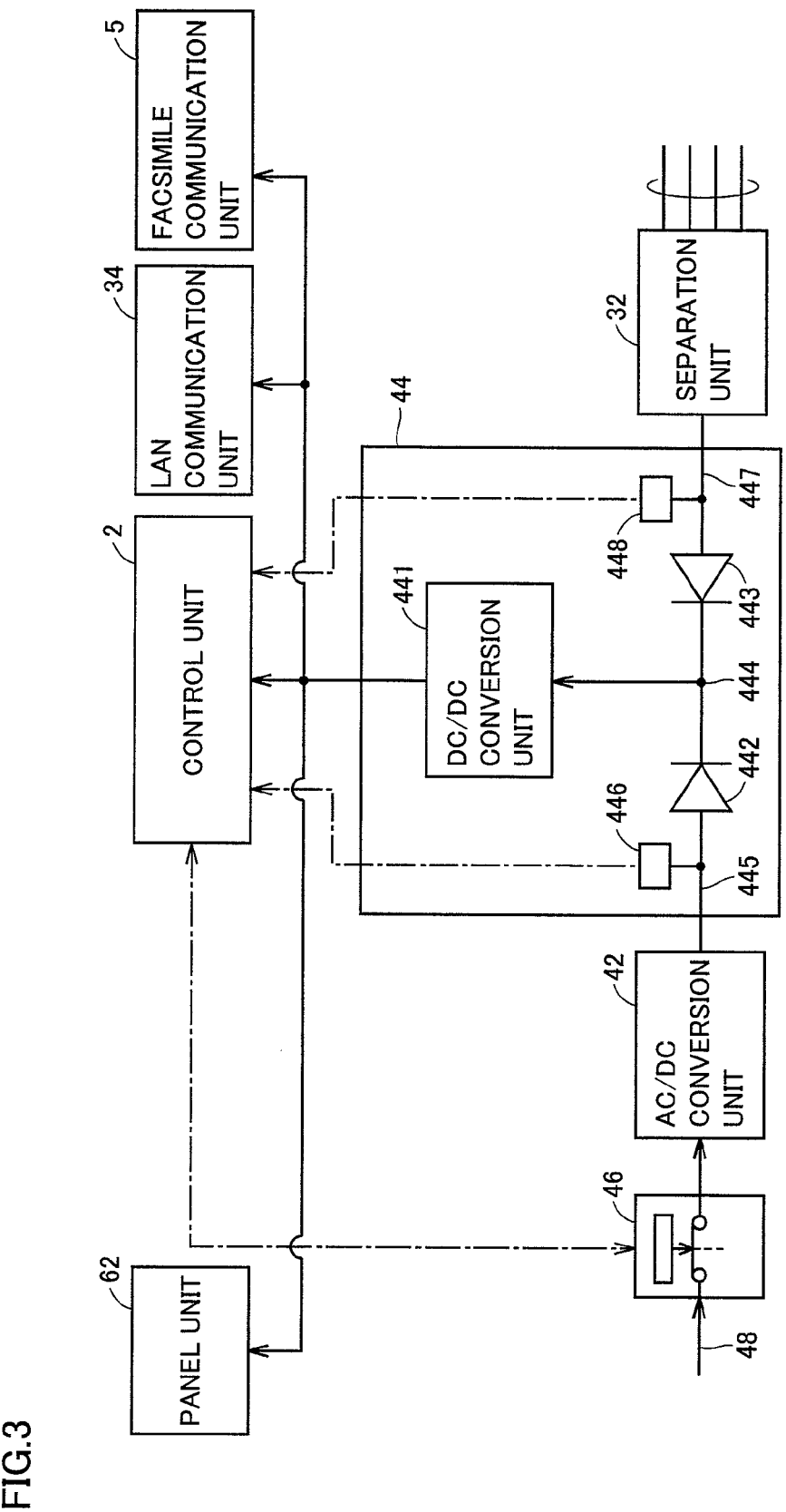
FIG. 3 is a schematic block diagram showing a configuration of a main portion involved in supplying power in accordance with the first embodiment.

With reference to FIG. 3, power supply unit 44 according to the first embodiment includes a DC/DC conversion unit 441, diodes 442 and 443, and voltage detection units 446 and 448. DC/DC conversion unit 441 is a voltage conversion unit for maintaining at a predetermined voltage the DC drive power supplied from AC/DC conversion unit 42 or separation unit 32. Note that AC/DC conversion unit 42 and separation unit 32 provide drive powers having rated voltage values, respectively, selected to be different from each other. In the present embodiment the rated voltage value of the first drive power provided from AC/DC conversion unit 42 is selected to be higher than that (for example of 48 V) of the second drive power provided from separation unit 32.

Diodes 442 and 443 prevent occurrence of countercurrent between AC/DC conversion unit 42 and separation unit 32. More specifically, diode 442 is inserted in a forward direction in an input line 445 extending from AC/DC conversion unit 42 to DC/DC conversion unit 441 and diode 443 is inserted in a forward direction in an input line 447 extending from separation unit 32 to DC/DC conversion unit 441. Such a configuration can prevent a current flowing from AC/DC conversion unit 42 toward separation unit 32 or that flowing from separation unit 32 toward AC/DC conversion unit 42.

In addition to such countercurrent prevention, diodes 442 and 443 output drive power selectively. More specifically, as has been described previously, the rated voltage value of the first drive power is selected to be higher than that of the second drive power. Accordingly, when AC/DC conversion unit 42 and separation unit 32 both supply their drive powers, the first drive power having the higher voltage value is selectively output. At the time, a node 444 has a voltage maintained at that of the first drive power. As such, even if the second drive power supplied from separation unit 32 is interrupted, the first drive power output from power supply unit 44 is unaffected. Herein when the first drive power is interrupted, diode 442 transitions from the on state to the off state and diode 443 transitions from the off state to the on state. As a result the second drive power will selectively be output. As the drive powers are thus switched, node 444 has a voltage decreased to that of the second drive power. However, DC/DC conversion unit 441 operates to maintain the voltage that is supplied to control unit 2 to have a constant value, and control unit 2, LAN communication unit 34, facsimile communication unit 5, and panel unit 62 thus have their respective operations unaffected.

Power supply unit 44 thus selects one of the drive powers received from AC/DC conversion unit 42 and separation unit 32 and outputs the selected drive power to control unit 2, LAN communication unit 34, facsimile communication unit 5 and panel unit 62 continuously.

Furthermore, voltage detection units 446 and 448 detect the values of the voltages appearing on input lines 445 and 447, respectively, and output their respective detection results to control unit 2.

With reference again to FIG. 2, control unit 2 includes a central processing unit (CPU) 22 for performing an operation process, and a memory 24 configured for example of a random access memory (RAM), a read only memory (ROM) and the like.

Control unit 2, LAN communication unit 34, facsimile communication unit 5 and panel unit 62 receive DC power from power supply unit 44 and operate thereon. In contrast, print engine load unit 6 including sensor unit 64 and drive unit 66 receives the first drive power from AC/DC conversion unit 42 and operates thereon.

Power ON/OFF Operation

Figure 4:
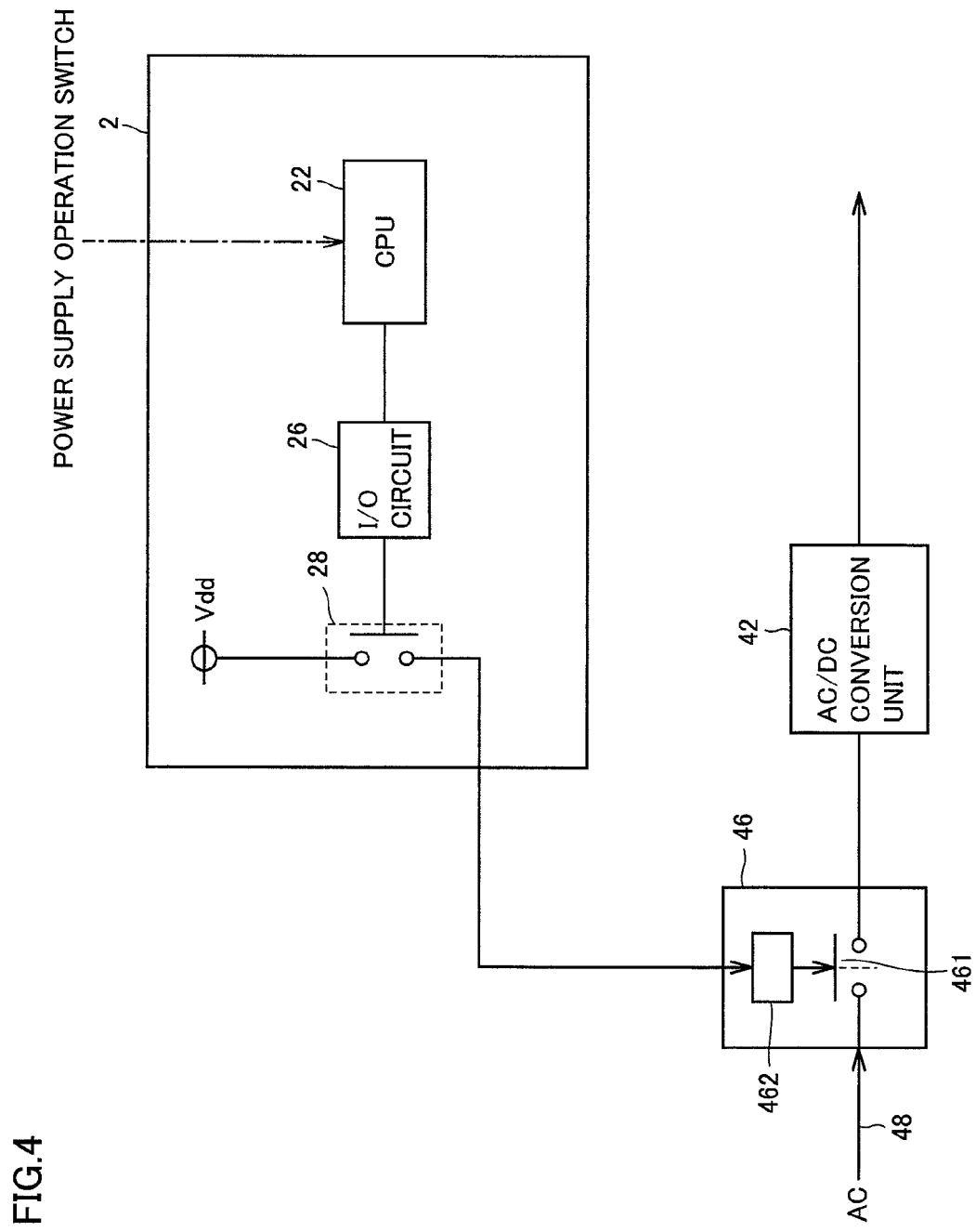
FIG. 4 shows a circuit configuration for powering on/off the image formation apparatus according to the first embodiment.

FIG. 4 shows a circuit configuration for powering on/off image formation apparatus MFP according to the first embodiment.

With reference to FIG. 4, in addition to CPU 22, control unit 2 further includes an I/O circuit 26 and a switch drive unit 28. As described below, if CPU 22 determines that power should be supplied or interrupted, CPU 22 provides a control instruction to I/O circuit 26 in accordance with the result of determination. In accordance with the control instruction, I/O circuit 26 outputs an "H" or "L" level signal to switch drive unit 28. In response to the "H" level signal, switch drive unit 28 is activated to bring a path between a power supply voltage Vdd and power supply switch 46 into a conductive state. On the other hand, in response to the "L" level signal, switch drive unit 28 is deactivated to bring the path between power supply voltage Vdd and power supply switch 46 into a non-conductive state.

Power supply switch 46 includes a contact 461 for rendering a path between a commercial power supply line 48 and AC/DC conversion unit 42 conductive, and a relay 462 for driving contact 461. It should be noted that contact 461 is given a force by a return spring toward upward in a plane of drawing. When fed with power supply voltage Vdd, relay 462 drives contact 461, thus bringing supply line 48 and AC/DC conversion unit 42 into a conductive state. Meanwhile, when supply of power supply voltage Vdd is interrupted, relay 462 cannot drive contact 461, whereby contact 461 is moved upward in the plane of drawing by the return spring. This brings supply line 48 and AC/DC conversion unit 42 into a non-conductive state.

Power State

Image formation apparatus MFP according to the present embodiment involves, as states regarding power supply, at least a "power on state" and a "power off state". In the present specification, the "power on state" refers to a state in which commercial power is received via supply line 48, whereas the "power off state" refers to a state in which supply of commercial power via supply line 48 is interrupted. It is assumed that, in both the states, network power is continuously supplied as long as image formation apparatus MFP is connected to hub device 76 via communication line 74.

First, in image formation apparatus MFP according to the present embodiment, in response to a user manipulating to switch from the power off state to the power on state, an authentication process is performed. If the authentication process is done successfully, image formation apparatus MFP is switched to the power on state. More specifically, when operation switch 50 is turned on, a message is displayed on display 62b to urge the user to enter identification information, and an authentication process is performed based on the entered identification information.

Since authentication is performed upon switching from the power off state to the power on state in this way, users permitted to power on image formation apparatus MFP can be limited. In other words, only users permitted in advance are eligible to switch image formation apparatus MFP to the power on state. Accordingly, an unspecified number of users can be avoided from operating to print a highly confidential document when it needs to be printed out. This achieves improved security performance.

In the power off state, print engine load unit 6 cannot be operated but LAN communication unit 34 and facsimile communication unit 5 can be operated using network power. In other words, an amount of supplied network power (15.4 W at maximum according to IEEE802.3af) is sufficiently larger than that of power consumed by LAN communication unit 34 and facsimile communication unit 5.

In the power off state, supply of power to at least LAN communication unit 34 and facsimile communication unit 5 is maintained so as to continue data communications or facsimile communications with other devices. Specifically, when LAN communication unit 34 receives data to be printed as well as an instruction for printing the data, control unit 2 temporarily stores the received data in memory 24. Likewise, when facsimile communication unit 5 receives facsimile data, control unit 2 temporarily stores the received facsimile data in memory 24. In the description below, data received from other devices to be printed, an instruction for printing it, facsimile data, and the like may be collectively referred to as a "print instruction".

A print process associated with such a print instruction received during the power off state is not performed unless image formation apparatus MFP is switched from the power off state to the power on state. In other words, unless a user operates operation switch 50 and a subsequent authentication process is done successfully, a document corresponding to the print instruction received during the power off state is never printed out.

Here, if the user is not notified that the print instruction has been received, he/she cannot know that it is required to switch image formation apparatus MFP from the power off state to the power on state. In addition, if the configuration of image formation apparatus MFP requires frequent switching from the power off state to the power on state to confirm whether or not the print instruction has been received, power consumption may be increased.

To avoid these, image formation apparatus MFP according to the present embodiment notifies the user that a print instruction has been received if the print instruction is received during the power off state, and displays a message to urge the user to enter identification information for execution of an authentication process.

FIG. 5 collectively shows relations of the above-described power on/off process in image formation apparatus MFP with the power state of image formation apparatus MFP, whether or not operation switch 50 is manipulated, whether or not an authentication process is done successfully, and whether or not there is a received print instruction.

FIG. 5 shows a table regarding the power on/off process in image formation apparatus MFP according to the first embodiment. With reference to FIG. 5, the power on/off process in image formation apparatus MFP according to the present embodiment can be classified into eight statuses 1-8, depending on the power state of image formation apparatus MFP, whether or not operation switch 50 is manipulated, whether or not an authentication process is done successfully, and whether or not there is a received print instruction.

Status 1 represents a case where operation switch 50 is switched on while image formation apparatus MFP is in the power on state. In this case, the power on state is maintained and therefore power supply switch 46 performs no operation, whereby the state thereof is maintained.

Status 2 represents a case where operation switch 50 is switched off while image formation apparatus MFP is in the power on state. In this case, power supply switch 46 is driven to switch it from the power on state to the power off state.

Status 3 represents a case where operation switch 50 is switched on while image formation apparatus MFP is in the power off state, and an authentication process in accordance with input identification information is done successfully. In this case, power supply switch 46 is driven to switch it from the power off state to the power on state.

Status 4 represents a case where operation switch 50 is switched on while image formation apparatus MFP is in the power off state, and an authentication process in accordance with input identification information has been failed or identification information has not been input yet. Assume that no print instruction has been received in status 4. In other words, status 4 corresponds to a status just after a user has switched on operation switch 50 while image formation apparatus MFP is in the power off state and no print instruction has not been received in the power off state. In status 4, a first message is displayed on display 62*b* to urge the user to enter identification information.

Figure 6:
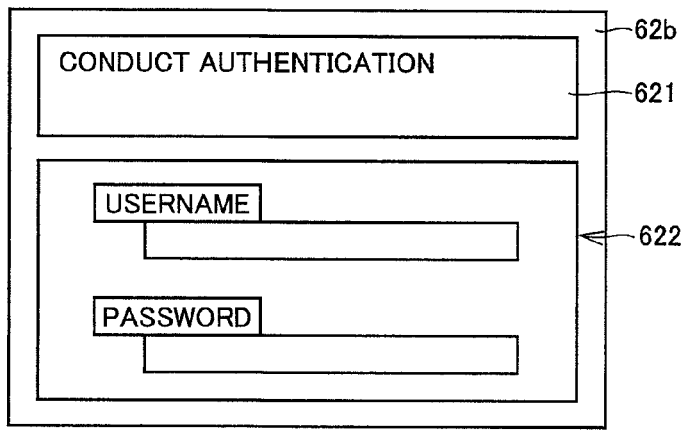
FIG. 6 shows an exemplary presentation on a display in a status 4 shown in FIG. 5.

FIG. 6 shows an exemplary presentation on display 62*b* in status 4 shown in FIG. 5. With reference to FIG. 6, display 62*b* presents a message displaying area 621 and an input area 622. In status 4 (FIG. 5), on message displaying area 621, a message "CONDUCT AUTHENTICATION" is displayed to urge the user to enter identification information, whereas on input area 622, a form is displayed in which a "username" and a corresponding "password" are to be entered. In other words, display 62*b* presents an entry screen for identification information, including a message indicating that authentication is required.

With reference to FIG. 5 again, status 5 represents a case where operation switch 50 is switched on while image formation apparatus MFP is in the power off state, and an authentication process in accordance with input identification information has been failed or identification information has not been input yet. Assume that a print instruction has been received in status 5. In other words, status 5 corresponds to a status just after a user has switched on operation switch 50 while image formation apparatus MFP is in the power off state and has received a print instruction during the power off state. In status 5, a second message is displayed on display 62*b* to urge the user to enter identification information.

Figure 7:
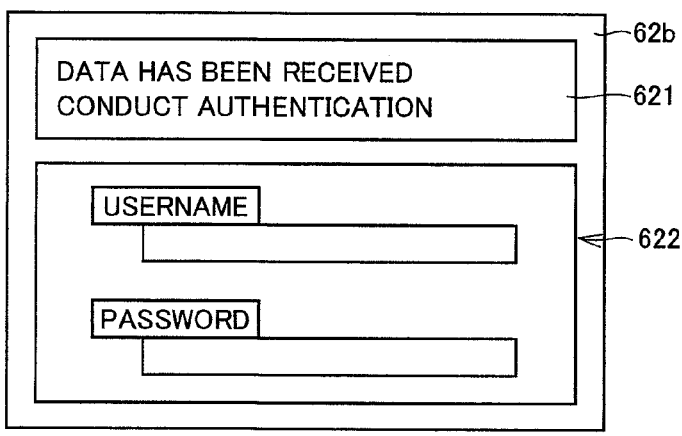
FIG. 7 shows an exemplary presentation on the display in a status 5 shown in FIG. 5.

FIG. 7 shows an exemplary presentation on display 62*b* in status 5 shown in FIG. 5. With reference to FIG. 7, in status 5 (FIG. 5), on message displaying area 621, a message "DATA HAS BEEN RECEIVED" is displayed to indicate that a print instruction has been received, and a message "CONDUCT AUTHENTICATION" is also displayed thereon to urge a user to enter identification information. On the other hand, on input area 622, a form is displayed in which a "username" and a corresponding "password" are to be entered. In other words, display 62*b* presents an entry screen for identification information, including messages indicating that a print instruction has been received and authentication is required.

With reference to FIG. 5 again, status 6 represents a case where operation switch 50 is not manipulated and no print instruction has been received while image formation apparatus MFP is in the power off state. In status 6, power supply switch 46 maintains its state and no special message is displayed on display 62*b*.

Status 7 represents a case where operation switch 50 is not manipulated but a print instruction has been received while image formation apparatus MFP is in the power off state. When a print instruction is received from an external device while image formation apparatus MFP is in the power off state, it transitions from status 6 to status 7. In status 7, a third message is displayed on display 62*b* to urge a user to enter identification information.

Figure 8:
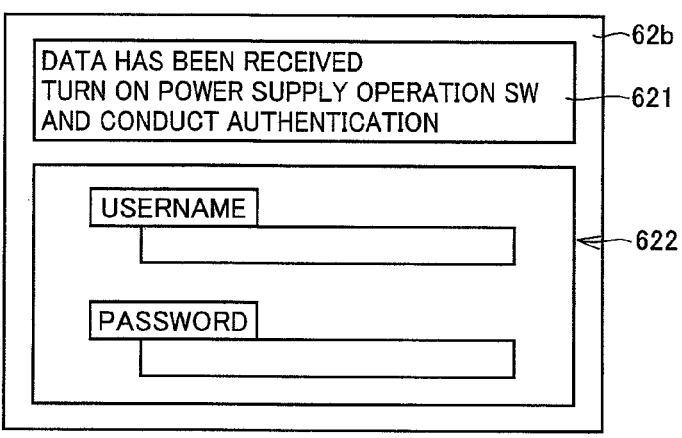
FIG. 8 shows an exemplary presentation on the display in a status 7 shown in FIG. 5.

FIG. 8 shows an exemplary presentation on display 62*b* in status 7 shown in FIG. 5. With reference to FIG. 8, in status 7 (FIG. 5), on message displaying area 621, a message "DATA HAS BEEN RECEIVED" is displayed to indicate that a print instruction has been received, and a message "TURN ON POWER SUPPLY OPERATION SW AND CONDUCT AUTHENTICATION" is displayed thereon to urge switching on operation switch 50 and urge a user to enter identification information. On the other hand, on input area 622, a form is displayed in which a "username" and a corresponding "password" are to be entered. In other words, display 62*b* presents an entry screen for identification information, including messages indicating that a print instruction has been received, authentication is required, and operation switch 50 has to be operated.

With reference to FIG. 5 again, status 8 represents a case where operation switch 50 is switched off and no print instruction has been received while image formation apparatus MFP is in the power off state. In status 8, power supply switch 46 maintains its state and no special message is displayed on display 62*b*.

Functional Configuration

Figure 9:
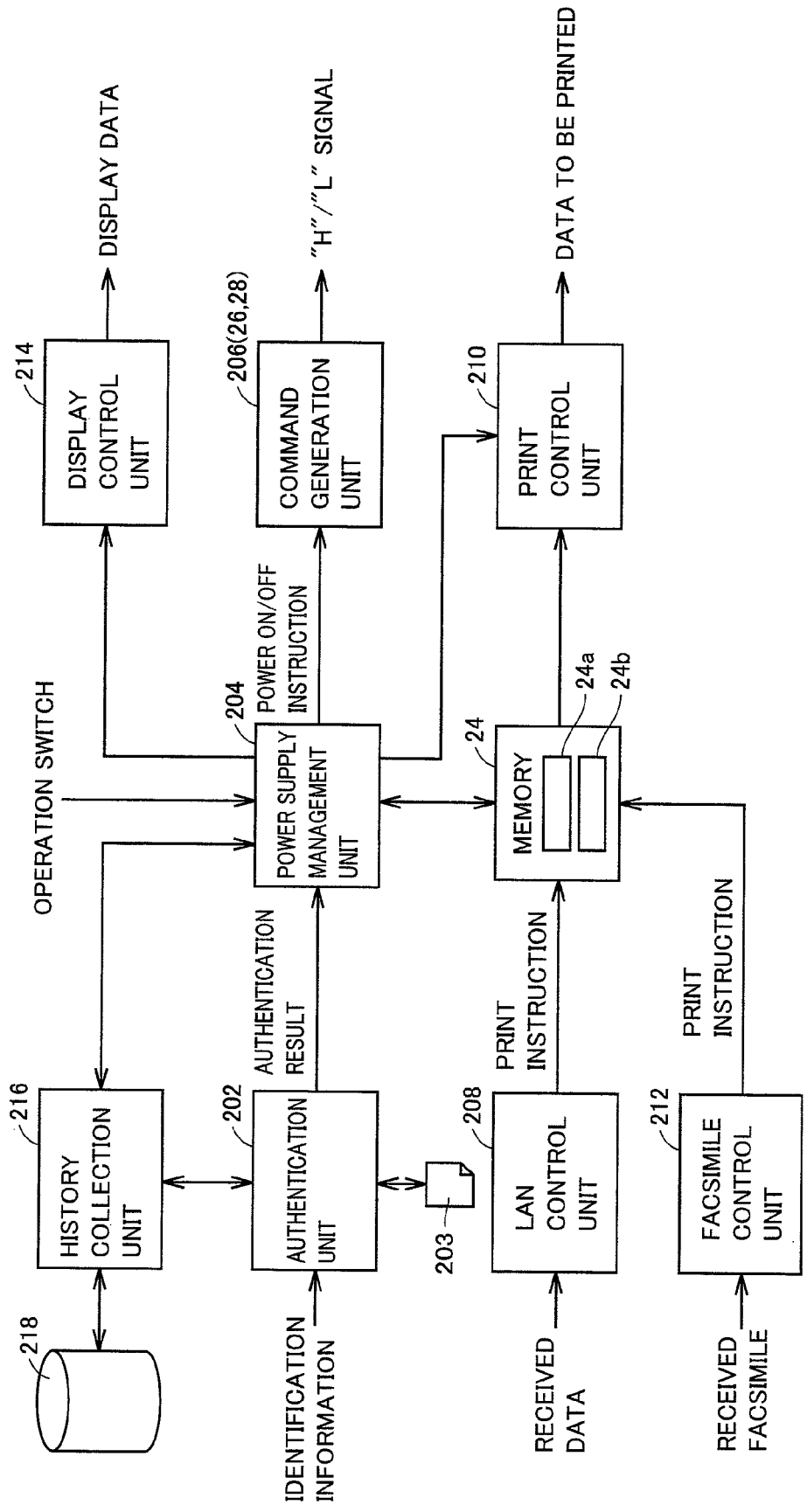
FIG. 9 is a block diagram showing a functional configuration in a control unit according to the first embodiment.

With reference to FIG. 9, control unit 2 according to the first embodiment includes an authentication unit 202, a power supply management unit 204, a command generation unit 206, a LAN control unit 208, a print control unit 210, a facsimile control unit 212, a display control unit 214, a history collection unit 216, and a history information storage unit 218 as its functions. Command generation unit 206 is implemented by I/O circuit 26, switch drive unit 28 (FIG. 4), and the like. Other functions are implemented mainly by CPU 22 (FIG. 2) as it executes a program previously stored in memory 24 (FIG. 2). Control unit 2 is typically a computer.

Namely, the above-mentioned program is delivered and/or distributed as a computer-readable storage medium that stores instructions for providing modules corresponding to the above-described units. A processor such as a CPU included in the computer executes the instructions stored in the computer-readable storage medium, by which the instructions cause the processor to execute all or a part of process steps described below. As the computer-readable storage medium, typically, a DVD (Digital Versatile Disk), CD-ROM (Compact Disk-Read Only Memory), flash memory, mask ROM and the like are cited.

Authentication unit 202 performs an authentication process based on identification information received via authentication input unit 62c (FIG. 2). More specifically, authentication unit 202 determines whether or not input identification information matches any one of entries previously registered in an authentication table 203. If the input identification information matches any one of the entries in authentication table 203, authentication unit 202 outputs an authentication result to notify power supply management unit 204 that the authentication has been done successfully. If not, it outputs another authentication result to notify power supply management unit 204 that the authentication has been failed.

With a predetermined period of time passing after the authentication process in authentication unit 202 has been done successfully, the authentication process may be invalidated. In other words, one authentication process successfully done may permit the user to use image formation apparatus MFP only for a predetermined period of time (for example, five minutes). Alternatively, the authentication process may be forced to be reset by a specific manipulation of a user (for example, operation switch 50 is turned on/off continuously). After the predetermined period of time has passed or the authentication process has been reset, image formation apparatus MFP is switched to the power off state or a low power consumption mode (energy saving mode). With such a function given, more improved security performance can be achieved.

LAN control unit 208 controls transmission and reception of data in LAN communication unit 34 (FIG. 2). In particular, when a print instruction is received through communication line 74, LAN control unit 208 stores the received print instruction to memory 24.

Facsimile control unit 212 controls transmission and reception of facsimile data in facsimile communication unit 5 (FIG. 2). In particular, when a print instruction is received through telephone line 78, facsimile control unit 212 stores the received print instruction to memory 24.

Memory 24 is provided with a first storage area 24a for storing a print instruction received from LAN control unit 208, and a second storage area 24b for storing a print instruction received from facsimile control unit 212.

Power supply management unit 204 controls power on/off of image formation apparatus MFP based on a user's manipulation on operation switch 50 and a result of authentication provided from authentication unit 202. If it is required to switch from the power on state to the power off state or switch from the power off state to the power on state, power supply management unit 204 outputs a power on/off instruction to command generation unit 206.

During the power off state, power supply management unit 204 makes reference to first storage area 24a and second storage area 24b so as to determine whether or not a print instruction has been received from an external device. Then, power supply management unit 204 outputs a display request to display control unit 214, depending on the power state (the power on state or the power off state), whether or not operation switch 50 is manipulated, whether or not the authentication process is done successfully, and whether or not there is a received print instruction.

In response to the display request from power supply management unit 204, display control unit 214 provides display 62b (FIG. 1) with display data such as one shown in FIGS. 6-8.

In response to a mode shift instruction provided from power supply management unit 204 to instruct shifting to the low power consumption mode, command generation unit 206 sends an "H" or "L" level signal to power supply switch 46 in accordance with a power on/off instruction from power supply management unit 204, to activate or deactivate power supply switch 46.

Print control unit 210 makes reference to power supply management unit 204 to find whether or not there exists a received print instruction in memory 24 upon switching from the power off state to the power on state. If so, it outputs the print instruction to the print engine.

History collection unit 216 collects history information regarding authentication processes for powering on image formation apparatus MFP. Specifically, history collection unit 216 sequentially collects names of users having been subjected to authentication processes, time at which each of authentication processes has been performed, results of the authentication processes, and the like, and stores the information in history information storage unit 218.

History information storage unit 218 stores the history information collected by history collection unit 216. History information storage unit 218 may be implemented as a region of a part of memory 24 or as a detachable storage medium (for example, a flash memory or the like). Further, it is preferable that history information storage unit 218 is accessible from an external device. By employing such a configuration, a power consumption status of image formation apparatus MFP can be monitored remotely.

By the functional configuration as described above, control unit 2 implements the power on/off process according to the present embodiment.

Procedure of Process

Figure 10:
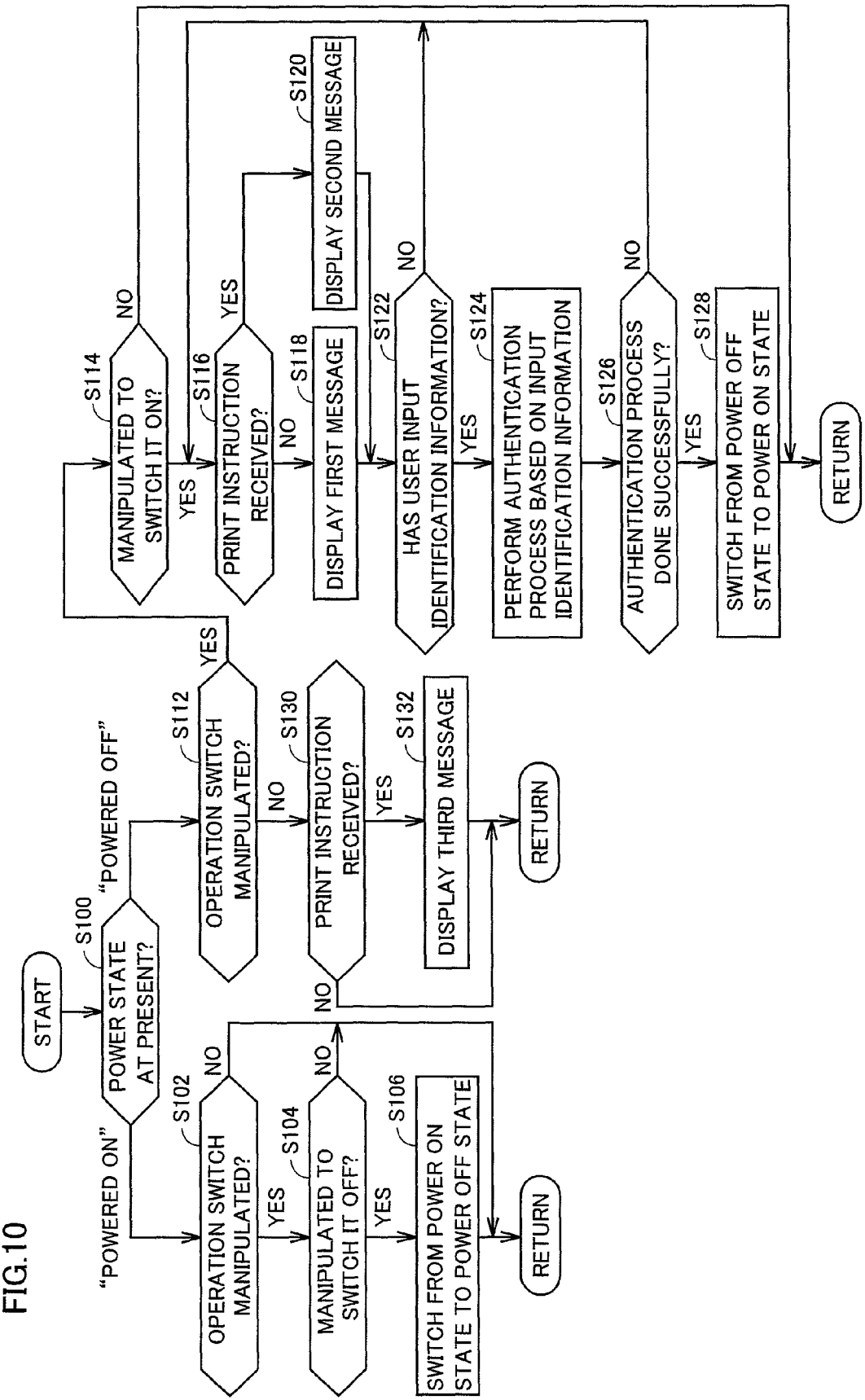
FIG. 10 is a flowchart showing a procedure of an entire process in the image formation apparatus according to the first embodiment.

FIG. 10 is a flowchart showing a procedure of an entire process in image formation apparatus MFP according to the first embodiment. The entire process shown in FIG. 10 is implemented by CPU 22 of control unit 2 as it executes a program stored in memory 24 or the like. Note that the process represented by the flowchart shown in FIG. 10 is repeatedly performed at a predetermined cycle (for example, several ten milliseconds to several minutes).

With reference to FIG. 10, control unit 2 determines the power state of image formation apparatus MFP at present (step S100). If image formation apparatus MFP is in the power on state ("POWERED ON" in step S100), the process goes to step S102. On the other hand, if image formation apparatus MFP is in the power off state ("POWERED OFF" in step S100), the process goes to step S112.

In step S102, control unit 2 determines whether or not operation switch 50 is manipulated. If operation switch 50 is not manipulated (NO in step S102), the process returns. On the other hand, if operation switch 50 is manipulated (YES in step S102), the process goes to step S104.

In step S104, control unit 2 determines whether or not the manipulation on operation switch 50 is to switch it off. If the manipulation on operation switch 50 is not to switch it off (NO in step S104), the process returns. On the other hand, if the manipulation on operation switch 50 is to switch it off (YES in step S104), the process goes to step S106.

In step S106, control unit 2 deactivates power supply switch 46 to switch image formation apparatus MFP from the power on state to the power off state. Thereafter, the process returns.

Meanwhile, in step S112, control unit 2 determines whether or not operation switch 50 is manipulated. If operation switch 50 is manipulated (YES in step S112), the process goes to step S114. On the other hand, if operation switch 50 is not manipulated (NO in step S112), the process goes to step S130.

In step S114, control unit 2 determines whether or not the manipulation on operation switch 50 is to switch it on. If the manipulation on operation switch 50 is not to switch it on (NO in step S114), the process returns. On the other hand, if the manipulation on operation switch 50 is to switch it on (YES in step S114), the process goes to step S116.

In step S116, control unit 2 determines whether or not a print instruction has been received from an external device. If a print instruction has not been received from an external device (NO in step S116), the process goes to step S118. If a print instruction has been received from an external device (YES in step S116), the process goes to step S120.

In step S118, control unit 2 causes display 62*b* to display the message (first message) shown in FIG. 6. Thereafter, the process goes to step S122.

In step S120, control unit 2 causes display 62*b* to display the message (second message) shown in FIG. 7. Thereafter, the process goes to step S122.

In step S122, control unit 2 determines whether or not the user inputs identification information. Note that control unit 2 waits for input of identification information for a predetermined period of time. If the user does not input identification information (NO in step S122), the process goes to step S116. On the other hand, if the user inputs identification information (YES in step S122), the process goes to step S124.

In step S124, control unit 2 performs an authentication process based on the input identification information. In step S126 coming thereafter, control unit 2 determines whether or not the authentication process is done successfully. If the authentication process is not done successfully (NO in step S126), the process goes back to step S116. On the other hand, if the authentication process is done successfully (YES in step S126), the process goes to step S128.

In step S128, control unit 2 activates power supply switch 46 to switch image formation apparatus MFP from the power off state to the power on state. Thereafter, the process returns.

Meanwhile, in step S130, control unit 2 determines whether or not a print instruction has been received from an external device. If a print instruction has not been received from an external device (NO in step S130), the process returns. On the other hand, if a print instruction has been received from an external device (YES in step S130), the process goes to step S132.

In step S132, control unit 2 causes display 62*b* to display the message (third message) shown in FIG. 8. Thereafter, the process returns.

Figure 11:
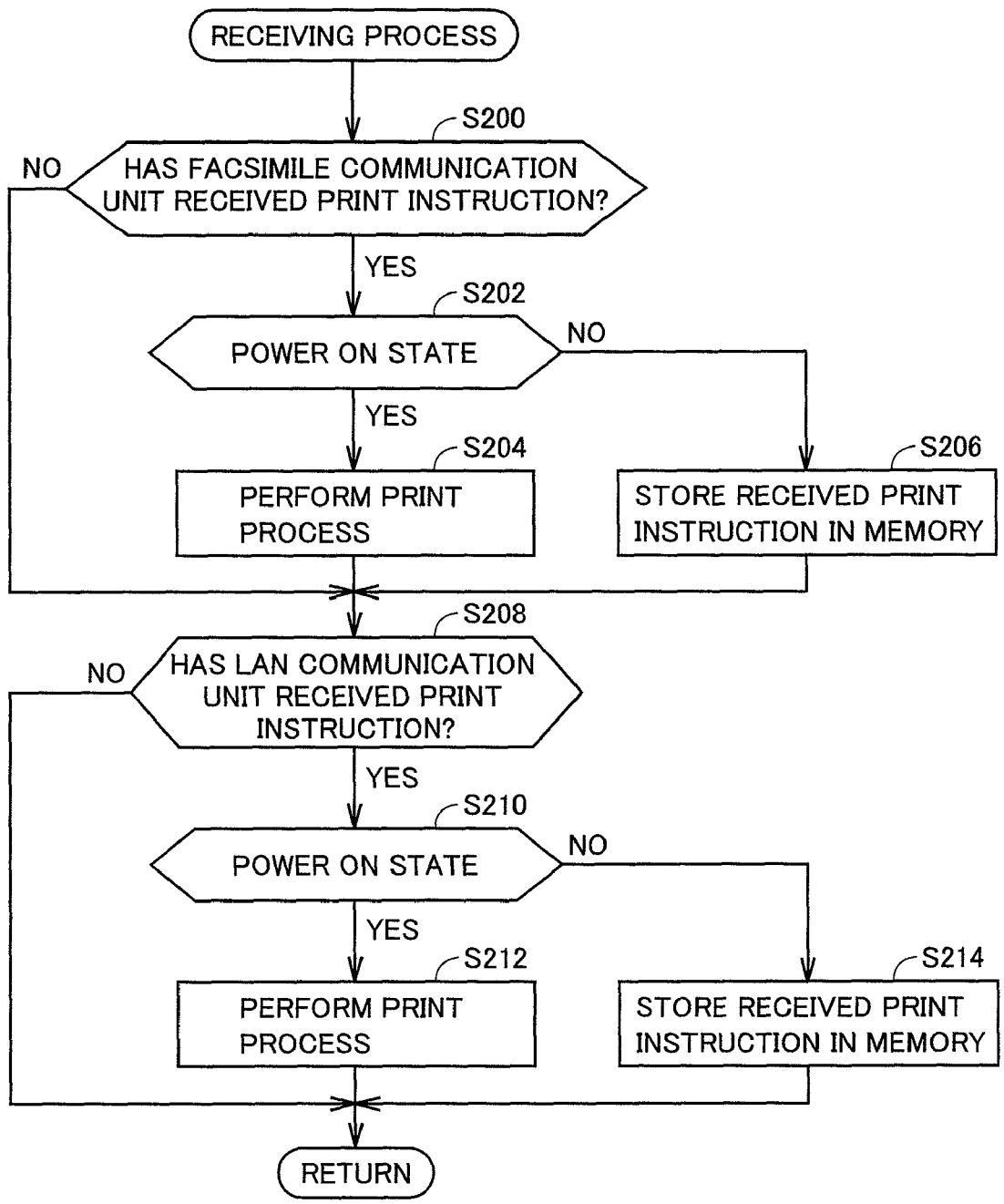
FIG. 11 is a flowchart showing a procedure of a receiving process in the image formation apparatus according to the first embodiment.

FIG. 11 is a flowchart showing a procedure of a receiving process in image formation apparatus MFP according to the first embodiment. The process procedure shown in FIG. 11 is implemented by CPU 22 of control unit 2 as it executes a program stored in memory 24 or the like. The process represented by the flowchart shown in FIG. 11 is repeatedly performed at a predetermined cycle (for example, several ten milliseconds to several minutes).

With reference to FIG. 11, control unit 2 determines whether or not facsimile communication unit 5 has received a print instruction (step S200). If facsimile communication unit 5 has received a print instruction (YES in step S200), the process goes to step S202. On the other hand, if facsimile communication unit 5 has not received a print instruction (NO in step S200), the process goes to step S208.

In step S202, control unit 2 determines whether or not image formation apparatus MFP is in the power on state. If image formation apparatus MFP is in the power on state (YES in step S202), the process goes to step S204. On the other hand, if image formation apparatus MFP is not in the power on state (NO in step S202), the process goes to step S206.

In step S204, control unit 2 performs a print process for the received print instruction. Then, the process goes to step S208.

In step S206, control unit 2 stores the received print instruction in memory 24. Then, the process goes to step S208.

In step S208, control unit 2 determines whether or not LAN communication unit 34 has received a print instruction. If LAN communication unit 34 has received a print instruction (YES in step S208), the process goes to step S210. On the other hand, if LAN communication unit 34 has not received a print instruction (NO in step S208), the process returns.

In step S210, control unit 2 determines whether or not image formation apparatus MFP is in the power on state. If image formation apparatus MFP is in the power on state (YES in step S210), the process goes to step S212. On the other hand, if image formation apparatus MFP is not in the power on state (NO in step S210), the process goes to step S214.

In step S212, control unit 2 performs a print process for the received print instruction. Then, the process returns.

In step S214, control unit 2 stores the received print instruction in memory 24. Then, the process returns.

Exemplary Application

Figure 12:
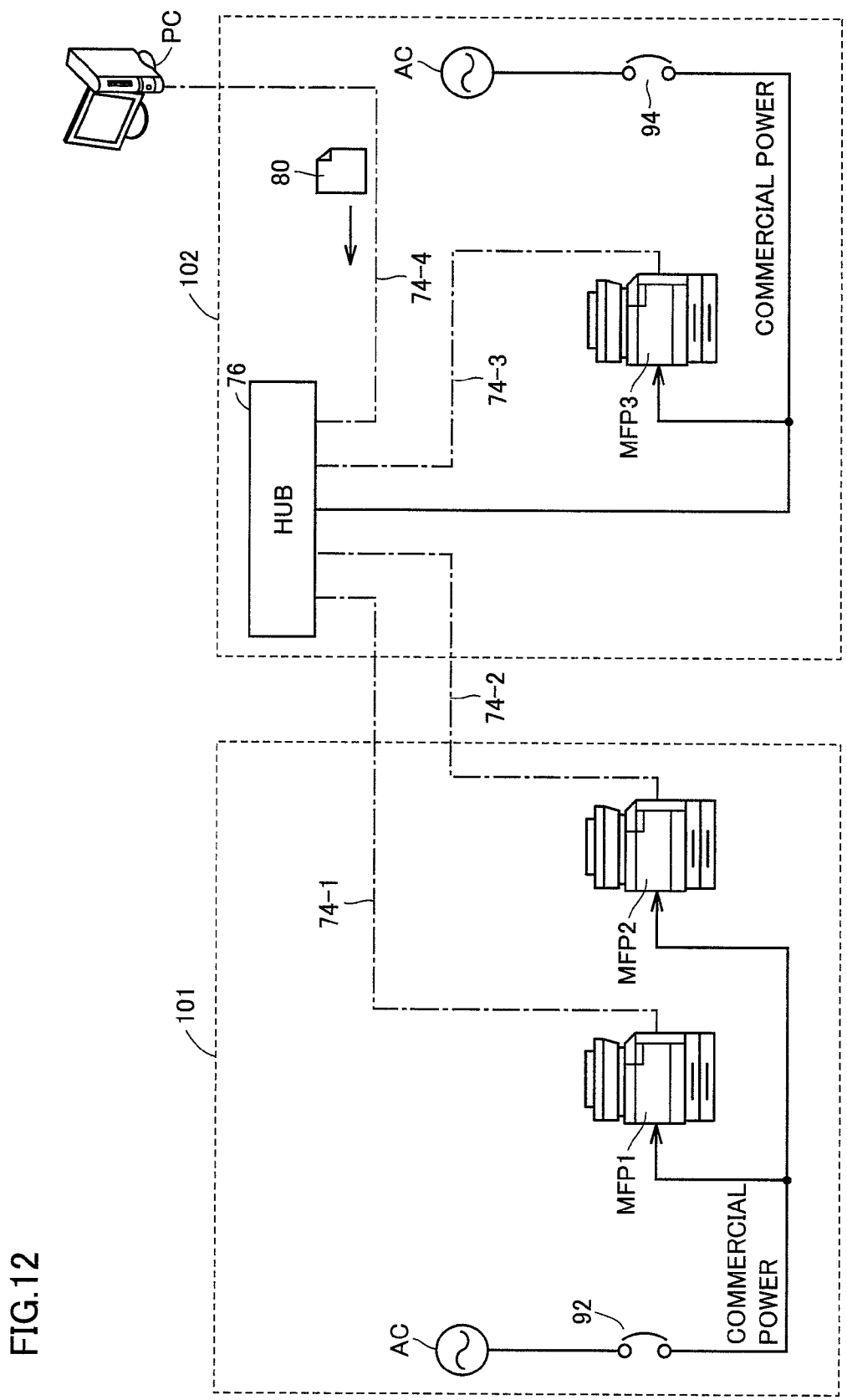
FIG. 12 is a schematic diagram showing an exemplary application of the image formation apparatus according to the first embodiment.

With reference to FIG. 12, for the sake of illustration, an office has a room 101 in which a user does his/her work for his/her business hours and a room 102 in which some service is continuously provided even before and/or after the business hours. Representatively, room 102 is for example a server room accommodating a server device. In room 101, two image formation apparatuses MFP1 and MFP2 are installed. They receive commercial power from power system AC via a breaker 92. Furthermore, in room 102, one image formation apparatus MFP3 and hub device 76 are installed. They receive commercial power from power system AC via a breaker 94.

Image formation apparatuses MFP1, MFP2 and MFP3 are connected to hub device 76 via communication lines 74-1, 74-2 and 74-3, respectively. As has been described previously, hub device 76 is equipped with a power supplying function, and supplies power to image formation apparatuses MFP1, MFP2 and MFP3 via communication lines 74-1, 74-2 and 74-3, respectively.

Furthermore, a personal computer PC is connected to hub device 76 via a communication line 74-4. Personal computer PC transmits a print instruction 80 for example to image formation apparatus MFP1. Image formation apparatus MFP1 receives print instruction 80 and performs the print process in accordance with print instruction 80.

Herein, to reduce power consumption in room 101, a system is discussed that stops supplying power to room 101 after all users have left room 101. More specifically, once all users have left room 101, breaker 92 is opened. In such a case, a conventional image formation apparatus would completely stop operation, and personal computer PC cannot communicate data with the conventional image formation apparatus.

In the present embodiment, in contrast, if supplying commercial power is interrupted, each of image formation apparatuses MFP can employ the network power supplied from hub device 76 to maintain a data communication function. Image formation apparatus MFP can thus receive a print instruction 80 from personal computer PC and store it in the memory. Thereafter, when supply of commercial power is resumed and an authentication process is successfully done, image formation apparatus MFP is switched from the power off state to the power on state, and performs a print process in accordance with the received print instruction 80. In this case, while image formation apparatus MFP is in the power off state, notification of the reception of the print instruction is made, and a message urging a user to enter identification information is displayed for execution of the authentication process.

Effects in the Present Embodiment

In image formation apparatus MFP according to the present embodiment, only users permitted in advance are eligible to switch it from the power off state to the power on state, and an unspecified number of users are therefore prevented from powering it on without discretion. This can avoid unnecessary increase of power consumed by image formation apparatus MFP. Further, since only specific users are permitted to manipulate image formation apparatus MFP, the content of a highly confidential document can be less likely to be leaked to an unspecified number of users when it needs to be printed out. This achieves improved security performance.

Further, image formation apparatus MFP according to the embodiment of the present invention is capable of continuing communication with external devices during the power off state, and can therefore receive a print instruction from an external device. If it receives a print instruction during the power off state, image formation apparatus MFP notifies that the print instruction has been received, and causes a message to be displayed so as to urge the user to enter identification information for execution of the authentication process. Accordingly, the user is permitted to bring image formation apparatus MFP into the power on state only for a period of time during which image formation apparatus MFP needs to be operated. Unnecessary increase of power consumption can be avoided.

Second Embodiment

The first embodiment described above illustrates a configuration in which each of image formation apparatuses MFP stores authentication table 203 in advance and an authentication process is performed based on authentication table 203 in each of image formation apparatuses MFP.

In an office accommodating a plurality of image formation apparatuses MFP, it is more efficient to manage such authentication tables 203 collectively. In view of this, a server device SRV may be provided on the same network as the plurality of image formation apparatuses MFP, and server device SRV may perform an authentication process.

Figure 13:
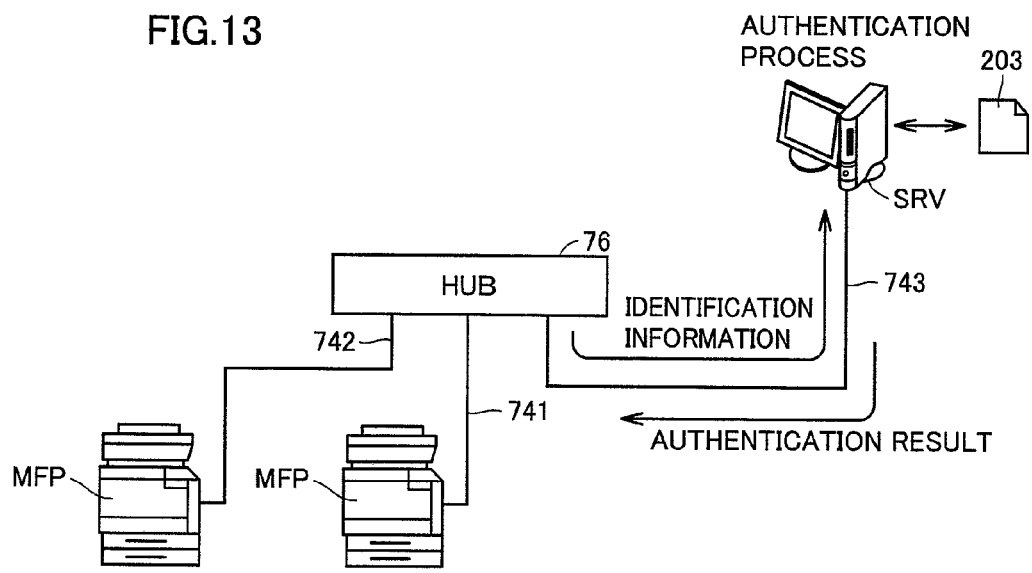
FIG. 13 shows an entire configuration of a system according to a second embodiment.

With reference to FIG. 13, in a system according to a second embodiment, the plurality of image formation apparatuses MFP and server device SRV are connected to a common hub device 76 via communication lines 741, 742 and 743. To switch from the power off state to the power on state, identification information entered into each of image formation apparatuses MFP is transmitted to server device SRV via the communication lines and hub device 76, and server device SRV performs an authentication process for each image formation apparatus MFP. Authentication result obtained through the authentication process is sent back to image formation apparatus MFP which has transmitted the identification information. Then, based on the authentication result thus sent back, an operation for powering on image formation apparatus MFP is performed therein.

Other configurations are the same as those of image formation apparatus MFP described in the foregoing first embodiment, and will not be described repeatedly in detail.

The present embodiment advantageously allows for more efficient user management in the case where a plurality of image formation apparatuses MFP are installed, in addition to the advantage provided by the foregoing first embodiment.

Third Embodiment

The foregoing first embodiment illustrates a configuration in which when image formation apparatus MFP is in the power off state and receives a print instruction from an external device, notification of the reception of the print instruction is made and a message is displayed to urge a user to enter identification information.

Some received print instructions, such as confidential facsimiles and network facsimiles employing e-mails, designate a destination user and are transmitted thereto. In such a case, only the destination user is permitted to print it. Hence, the above-described messages are preferably modified for such a specific user.

To accommodate this, in the present embodiment, when receiving a print instruction designating a destination user, the destination is identified, notification of the reception of the print instruction is made, and a message is displayed to urge the user to enter identification information.

Figure 14:
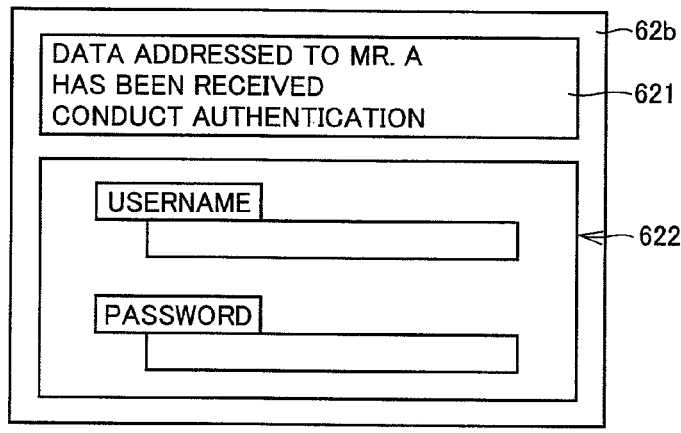
FIG. 14 shows an exemplary presentation on a display in an image formation apparatus according to a third embodiment.

FIG. 14 shows an exemplary presentation on display 62b in an image formation apparatus according to a third embodiment. Note that the displayed exemplary presentation shown in FIG. 14 corresponds to that shown in FIG. 7.

With reference to FIG. 14, message displaying area 621 displays a message "DATA ADDRESSED TO MR. A HAS BEEN RECEIVED", which indicates that a print instruction addressed to a specific user (in this example, "user A") has been received, as well as a message "CONDUCT AUTHENTICATION", which urges "user A" to enter identification information. Further, input area 622 displays a form in which a "username" and a corresponding "password" are to be entered. In the form displayed on input area 622, spaces for the "username" may be filled with the username of "user A" in advance.

Further, the authentication process may be adapted to permit only the destination user for the print instruction to be subjected to authentication.

Other configurations are similar to those in image formation apparatus MFP shown in the foregoing first embodiment, and will not be described repeatedly in detail.

The present embodiment advantageously allows for more improved security performance, in addition to the advantage provided by the foregoing first embodiment.

Fourth Embodiment

The foregoing first embodiment illustrates a configuration in which various types of messages are displayed on display 62b of panel unit 62. However, the messages may be displayed on another device (representatively, a personal computer) connected to image formation apparatus MFP via a network. From this device, a user may input identification information to cause image formation apparatus MFP to perform an authentication process for the power on operation.

Particularly, when a print instruction addressed to a specified destination as described in the foregoing third embodiment is received, the destination is identified, notification of the reception of the print instruction is made thereto, and a message is displayed thereon to urge the designated user to enter identification information.

In a fourth embodiment, the following will illustrate a configuration in which such a remote manipulation causes the power on operation to be performed.

Figure 15:
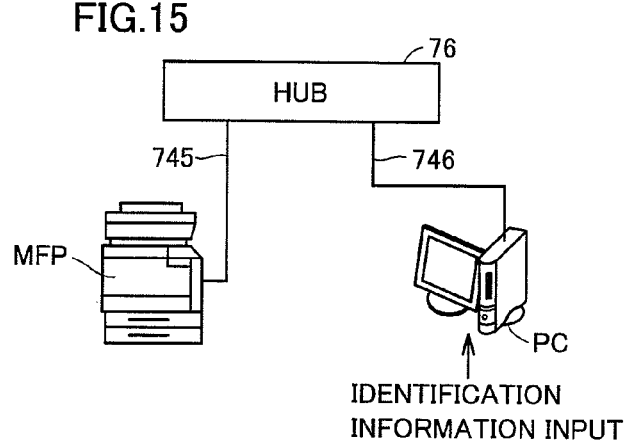
FIG. 15 shows an entire configuration of a system according to a fourth embodiment.

With reference to FIG. 15, in a system according to the fourth embodiment, image formation apparatus MFP and personal computer PC are respectively connected via communication lines 745 and 746 to common hub device 76. When receiving a print instruction addressed to a destination user, image formation apparatus MFP identifies the destination user and a personal computer PC used by the user. Then, image formation apparatus MFP transmits messages to personal computer PC thus identified.

Figure 16:
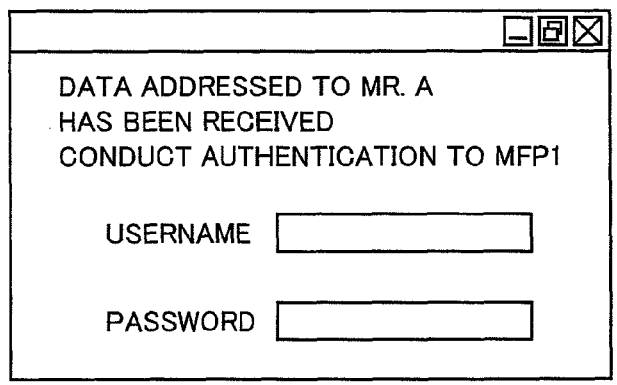
FIG. 16 shows an exemplary presentation on a personal computer according to a fourth embodiment.

FIG. 16 shows an exemplary presentation on personal computer PC according to the fourth embodiment.

With reference to FIG. 16, a personal computer PC used by a destination user for a certain print instruction displays a pop-up including a message "DATA ADDRESSED TO MR. A HAS BEEN RECEIVED", which indicates that a print instruction addressed to a specific user (in this example, "user A") has been received, as well as a message "CONDUCT AUTHENTICATION TO MFP1", which urges "user A" to enter identification information to image formation apparatus MFP1. In this pop-up, a form is displayed in which a "username" and a corresponding "password" are to be entered. In the form, spaces for the "username" may be filled with the username of "user A" in advance.

When "user A" enters his username and password from the pop-up shown in FIG. 16, the identification information thus entered is transmitted to image formation apparatus MFP, which then performs an authentication process and thereafter performs the power on operation. In addition, image formation apparatus MFP performs a print process for the print instruction of interest.

Figure 17:
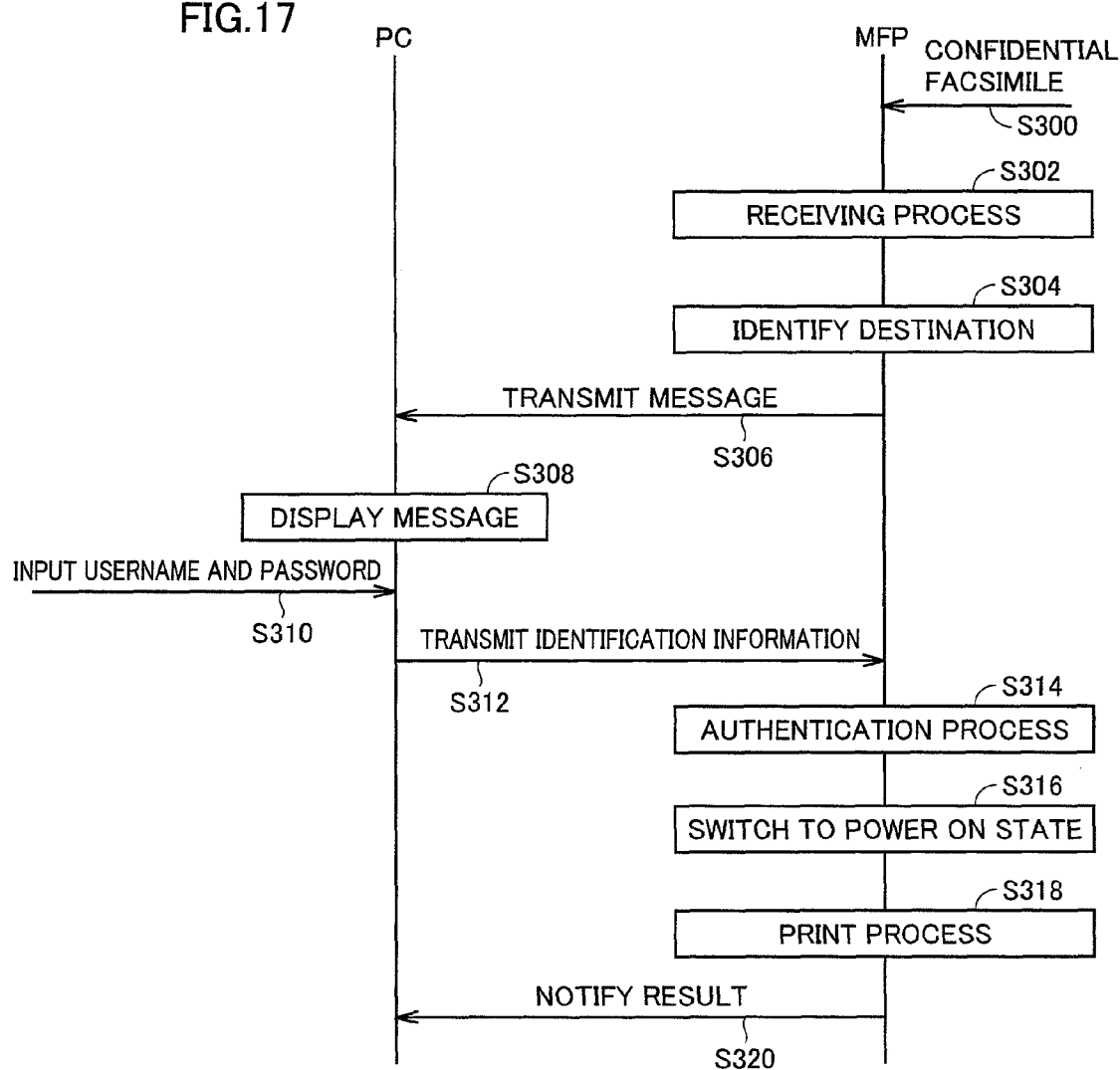
FIG. 17 is a sequence diagram showing a procedure of an entire process in the system according to the fourth embodiment.

FIG. 17 is a sequence diagram showing a procedure of an entire process in the system according to the fourth embodiment. Assume that image formation apparatus MFP is initially in the power off state.

With reference to FIG. 17, when a print instruction addressed to a designated destination user, such as a confidential facsimile, is first transmitted to image formation apparatus MFP (step S300), image formation apparatus MFP performs a process of receiving the print instruction (step S302). Image formation apparatus MFP identifies the destination of the received print instruction (step S304). Then, image formation apparatus MFP transmits messages to a personal computer PC used by the identified destination user (step S306). Personal computer PC used by the identified destination user may be identified through inquiries to a server device or the like which manages login statuses of users.

Personal computer PC displays the messages received from image formation apparatus MFP (step S308). For the messages thus displayed, the user enters identification information (a username and a password) (step S310). Then, the identification information entered by the user is transmitted from personal computer PC to image formation apparatus MFP (step S312).

Based on the received identification information, image formation apparatus MFP performs an authentication process (step S314). If the authentication process is done successfully, image formation apparatus MFP operates to switch from the power off state to the power on state (step S316). After completion of switching to the power on state, image formation apparatus MFP performs a print process for the print instruction of interest (step S318). In this way, a document is printed out based on the received print instruction. Finally, image formation apparatus MFP notifies personal computer PC of respective results of the authentication process and the print process (step S320). Then, the process ends.

Other configurations are similar to those in image formation apparatus MFP in the foregoing first embodiment and will not be described repeatedly in detail.

The present embodiment advantageously ensures that received data is printed out even if a user is in a location remote from image formation apparatus MFP, in addition to the advantage in the foregoing first embodiment.

Fifth Embodiment

The foregoing first embodiment illustrates a configuration in which two types of power supply (commercial power and network power) are received, but extra power supply may be added.

Figure 18:
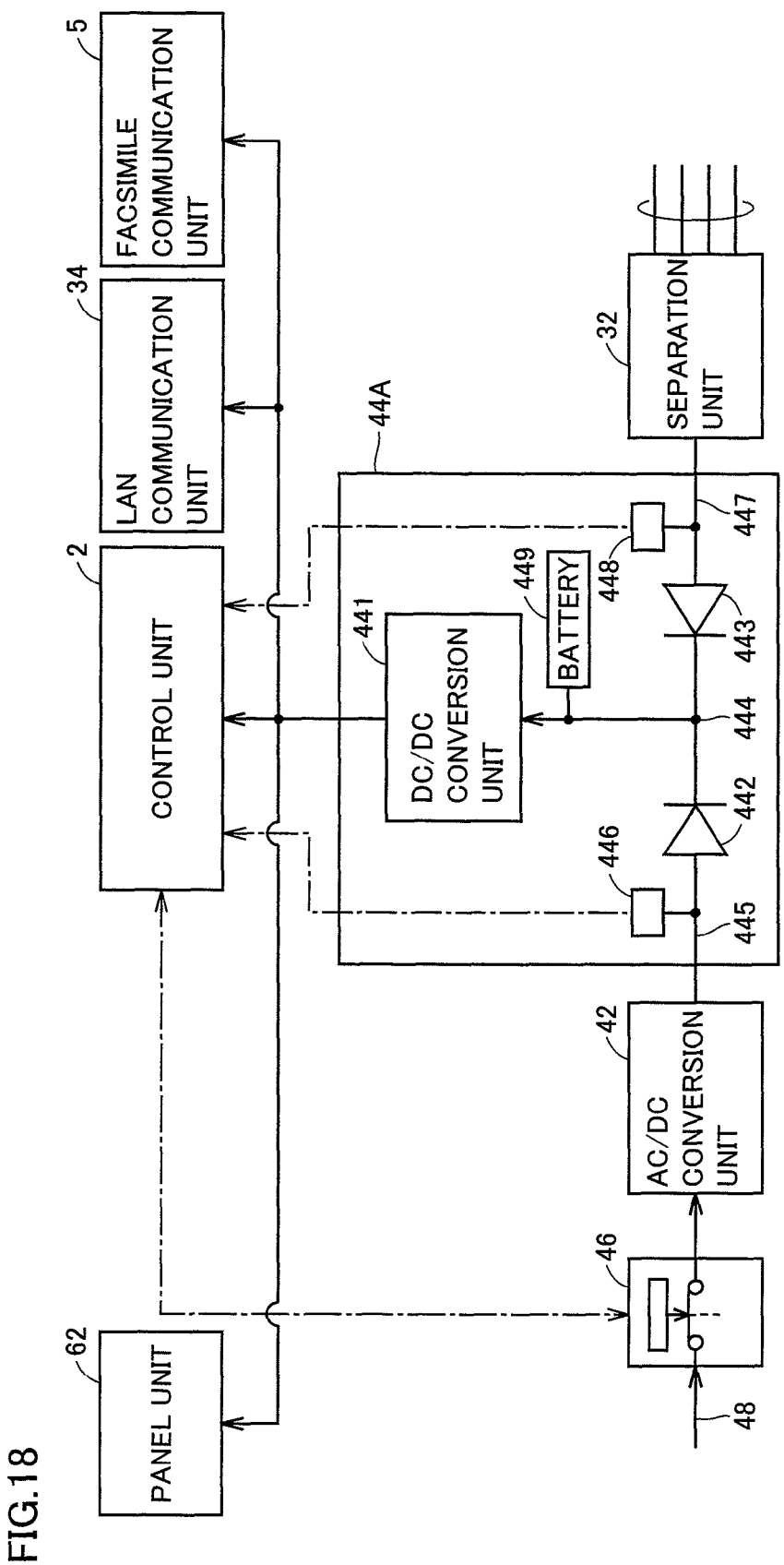
FIG. 18 is a schematic block diagram showing a main portion involved in supplying power in accordance with a fifth embodiment.

FIG. 18 is a schematic block diagram showing a configuration in a main portion involved in supplying power in accordance with the fifth embodiment. The configuration shown in FIG. 18 is equivalent to a configuration obtained by replacing power supply unit 44 in the configuration shown in FIG. 3 with a power supply unit 44A. Remainders are similar to those in FIG. 3.

Power supply unit 44A corresponds to power supply unit 44 with a battery 449 added between node 444 and DC/DC conversion unit 441. Battery 449 is a rechargeable storage unit and is charged by a part of current flowing in node 444. When supply of commercial power and network power is stopped or the like, battery 449 discharges power previously stored therein so as to assist continuous supply of power to control unit 2, LAN communication unit 34 (FIG. 2), facsimile communication unit 5 (FIG. 2), and panel unit 62.

Other configurations are similar to those in image formation apparatus MFP in the foregoing first embodiment, and will not be described repeatedly in detail.

The present embodiment advantageously allows for continuous communications of image formation apparatus MFP even when power supply from hub device 76 and the like is temporarily stopped, in addition to the advantage provided by the foregoing first embodiment.

Combinations of the First to Fifth Embodiments

Two or more of the first to fifth embodiments can be combined appropriately.

Other Embodiments

Each of the above-described embodiments illustrates, as one exemplary image formation apparatus of the present invention, an MFP having a plurality of functions such as a copy function, a print function, a facsimile function, and a scanner function, but the present invention is not limited to this. For example, an image formation apparatus of the present invention may be a digital copier, a printer, a facsimile device, or the like, each of which has a network communication function.

As a representative example of print engine load unit 6, sensor unit 64 and drive unit 66 are illustrated. However, print engine load unit 6 necessarily does not need to include them all, and for example, sensor unit 64 may be excluded from print engine load unit 6.

In the above-described embodiments, a message is displayed on display 62b constituted by an LCD or the like (FIGS. 6-8). Instead, a plurality of lamps, such as LEDs, previously associated with various types of messages may be provided and lit up. Alternatively, messages may be presented through audio outputs.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An image formation apparatus connected to a power supplying device capable of supplying power via a data communication line, comprising:
    a control unit;
    a power conversion unit for converting external power received from an external power source into first drive power and outputting said first drive power;
    a separation unit for separating a communication signal and power flowing in said data communication line and outputting as second drive power the power thus separated;
    a communication unit for communicating data with an external device;
    a power supply unit for supplying at least one of said first drive power and said second drive power to said control unit and said communication unit;
    a power supply switch, provided between said external power source and said power conversion unit, for opening/closing a power path in response to an instruction from said control unit;
    a power load unit, operable by receiving said first drive power, for performing an image formation process;
    an operation switch provided at a main body of said image formation apparatus; and
    an authentication unit for performing an authentication process based on identification information input by a user,
    said control unit being operative to:
        notify the user to switch on said operation switch and input said identification information, if said communication unit receives a print instruction while said power supply switch is in an open position, and
        cause said authentication unit to perform the authentication process based on said identification information input when said operation switch is switched on, and to close said power supply switch if the authentication process is succeeded,
    said power load unit performing the image formation process for said print instruction using said first drive power supplied after said power supply switch is switched from the open position to a closed position.

2. The image formation apparatus according to claim 1, further comprising a collection unit for collecting history information regarding opening and closing of said power supply switch.

3. The image formation apparatus according to claim 1, wherein said communication unit includes at least one of a first communication unit capable of communicating data with said external device using the communication signal separated by said separation unit, and a second communication unit capable of communicating data with said external device through a telephone line.

4. The image formation apparatus according to 1, wherein said print instruction is designated to a destination user, and in said authentication process, information regarding said destination user thus designated is automatically input as said identification information.

5. The image formation apparatus according to claim 1, further comprising a display unit capable of displaying information, wherein
    said control unit is operative to cause said display unit to display thereon a predetermined screen for notifying the user to switch on said operation switch and input said identification information.

6. The image formation apparatus according to claim 5, wherein said predetermined screen includes a message indicating that said print instruction has been received.

7. The image formation apparatus according to claim 1, wherein said print instruction is designated to a destination user, and in the authentication process, only said destination user thus designated is permitted to be subjected to the authentication process.

8. A control method performed by an image formation apparatus connected to a power supplying device capable of supplying power via a data communication line, comprising:
    converting, by a power conversion unit, external power received from an external power source into first drive power and outputting said first drive power, said image formation apparatus including a power load unit, operable by receiving said first drive power, for performing an image formation process;
    separating a communication signal and power flowing in said data communication line;
    outputting as second drive power the power thus separated;
    receiving at least one of said first drive power and said second drive power to communicate data with an external device;
    opening/closing a power supply switch provided between said external power source and said power conversion unit;
    receiving an instruction input by a user to open/close said power supply switch;
    notifying the user to switch on an operation switch provided at a main body of said image formation apparatus and input identification information, if a print instruction is received in communicating data with said external device, while said power supply switch is in an open position; and
    performing an authentication process based on said identification information input when said operation switch is switched on, and closing said power supply switch if the authentication process is succeeded, wherein
    said power load unit performs the image formation process for said print instruction using said first drive power supplied after said power supply switch is switched from the open position to a closed position.

9. The control method performed by the image formation apparatus according to claim 8, wherein the image formation apparatus further includes a display unit capable of displaying information,
    the control method further comprising the step of causing said display unit to display thereon a predetermined screen for notifying the user to switch on said operation switch and input said identification information.

10. The control method performed by the image formation apparatus according to claim 9, wherein in the step of causing said display unit to display thereon said predetermined screen, a message indicating that said print instruction has been received is displayed.

11. The control method performed by the image formation apparatus according to claim 8, further comprising the step of collecting history information regarding opening and closing of said power supply switch.

12. The control method performed by the image formation apparatus according to claim 8, wherein in the step of communicating data with said external device, at least one of communicating data with said external device using the communication signal separated in the step of separating, and communicating data with said external device through a telephone line is performed.

13. The control method performed by the image formation apparatus according to claim 8, wherein said print instruction is designated to a destination user, and in the step of performing said authentication process, information regarding said destination user thus designated is automatically input as said identification information.

14. The control method performed by the image formation apparatus according to claim 8, wherein said print instruction is designated to a destination user, and in the step of performing said authentication process, only said destination user thus designated is permitted to be subjected to the authentication process.

15. A non-transitory computer-readable storage medium storing a program used in an image formation apparatus connected to a power supplying device capable of supplying power via a data communication line,
    said image formation apparatus including:
        a computer for controlling said image formation apparatus;
        a power conversion unit for converting external power received from an external power source into first drive power and outputting said first drive power;
        a separation unit for separating a communication signal and power flowing in said data communication line and outputting as second drive power the power thus separated;
        a communication unit for communicating data with an external device;
        a power supply unit for supplying at least one of said first drive power and said second drive power to said computer and said communication unit;
        a power supply switch, provided between said external power source and said power conversion unit, for opening/closing a power path in response to an instruction from said computer;
        a power load unit, operable by receiving said first drive power, for performing an image formation process;
        an operation switch provided at a main body of said image formation apparatus; and
        an authentication unit for performing an authentication process based on identification information input by a user,
    said program causing said computer to perform the steps of:
        notifying the user to switch on said operation switch and input said identification information, if said communication unit receives a print instruction while said power supply switch is in an open position, and
        causing said authentication unit to perform the authentication process based on said identification information input when said operation switch is switched on, and to close said power supply switch if the authentication process is succeeded, wherein
    said power load unit performs the image formation process for said print instruction using said first drive power supplied after said power supply switch is switched from the open position to the closed position.

16. The program used in the image formation apparatus according to claim 15, wherein:
    the image formation apparatus further includes a display unit capable of displaying information, and
    the program further causing said computer to perform the step of causing said display unit to display thereon a predetermined screen for notifying the user to switch on said operation switch and input said identification information.

17. The program used in the image formation apparatus according to claim 16, wherein
    in the step of causing said display unit to display thereon said predetermined screen, a message indicating that said print instruction has been received is displayed.

18. The program used in the image formation apparatus according to claim 15, wherein said program further causing said computer to perform the step of collecting history information regarding opening and closing of said power supply switch.

19. The program used in the image formation apparatus according to claim 15, wherein said communication unit includes at least one of a first communication unit capable of communicating data with said external device using the communication signal separated by said separation unit, and a second communication unit capable of communicating data with said external device through a telephone line.

20. The program used in the image formation apparatus according to claim 15, wherein said print instruction is designated to a destination user, and in said authentication process, information regarding said destination user thus designated is automatically input as said identification information.

21. The program used in the image formation apparatus according to claim 15, wherein said print instruction is designated to a destination user, and in the authentication process, only said destination user thus designated is permitted to be subjected to the authentication process.

* * * * *

UNITED STATES PATENT AND TRADEMARK OFFICE
CERTIFICATE OF CORRECTION

| | | |
|---|---|---|
| PATENT NO. | : 8,031,351 B2 | Page 1 of 1 |
| APPLICATION NO. | : 12/562465 | |
| DATED | : October 4, 2011 | |
| INVENTOR(S) | : Takeshi Tamada | |

It is certified that error appears in the above-identified patent and that said Letters Patent is hereby corrected as shown below:

In the Claims:

At column 24, claim number 15, line number 15, before the word "closed", please replace "the" with --a--.

Signed and Sealed this

Thirteenth Day of March, 2012

David J. Kappos
*Director of the United States Patent and Trademark Office*